US008094526B2

(12) United States Patent
Koda et al.

(10) Patent No.: US 8,094,526 B2
(45) Date of Patent: Jan. 10, 2012

(54) INFORMATION RECORDING DEVICE AND METHOD, AND COMPUTER PROGRAM

(75) Inventors: Takeshi Koda, Saitama (JP); Kazuo Kuroda, Saitama (JP); Masayoshi Yoshida, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 981 days.

(21) Appl. No.: 10/590,738

(22) PCT Filed: Feb. 18, 2005

(86) PCT No.: PCT/JP2005/002587
§ 371 (c)(1),
(2), (4) Date: Nov. 1, 2006

(87) PCT Pub. No.: WO2005/083709
PCT Pub. Date: Sep. 9, 2005

(65) Prior Publication Data
US 2007/0217298 A1    Sep. 20, 2007

(30) Foreign Application Priority Data

Feb. 27, 2004   (JP) ................................ 2004-054329

(51) Int. Cl.
G11B 7/085      (2006.01)
(52) U.S. Cl. .................................................. 369/30.23
(58) Field of Classification Search ............... 369/30.23, 369/59.25, 275.3, 47.28, 47.16, 284; 386/125
See application file for complete search history.

(56) References Cited

U.S. PATENT DOCUMENTS

| 5,604,727 | A  | * | 2/1997  | Ishihara ..................... 369/47.28 |
| 5,754,508 | A  | * | 5/1998  | Hosoda et al. ............. 369/47.16 |
| 2002/0012310 | A1 | * | 1/2002  | Miyauchi et al. .......... 369/59.25 |
| 2003/0112737 | A1 | * | 6/2003  | Thompson et al. ........... 369/284 |
| 2003/0137915 | A1 | * | 7/2003  | Shoji et al. ................. 369/59.25 |
| 2003/0202782 | A1 | * | 10/2003 | Motohashi et al. ........... 386/125 |
| 2003/0227846 | A1 | * | 12/2003 | Lee et al. .................... 369/53.21 |
| 2004/0125738 | A1 | * | 7/2004  | Lee et al. .................... 369/275.3 |
| 2004/0156294 | A1 | * | 8/2004  | Watanabe et al. ............... 369/94 |
| 2005/0013222 | A1 | * | 1/2005  | Lee et al. .................... 369/47.51 |

FOREIGN PATENT DOCUMENTS

| JP | 09-016966     |   | 1/1997  |
| JP | 2000-503556   |   | 3/2000  |
| JP | 2000-311346   |   | 11/2000 |
| JP | 2001-023237   |   | 1/2001  |
| JP | 2001-148166 A |   | 5/2001  |
| JP | 2002-216361   | * | 2/2002  |
| JP | 2002-133667   |   | 5/2002  |
| JP | 2003-059059   |   | 2/2003  |
| JP | 2003-132630   |   | 5/2003  |

* cited by examiner

*Primary Examiner* — Ali Neyzari
(74) *Attorney, Agent, or Firm* — Young & Thompson

(57) ABSTRACT

An information recording apparatus comprising: a writing device capable of writing record information onto an information recording medium comprising first and second recording layers; a first controlling device for controlling said writing device to continuously write the record information into the first and second recording layers; a second controlling device for controlling said writing device to write a predetermined amount of buffer data on an outer circumferential side of the record information written in the first and second recording layers; and a third controlling device for controlling said writing device to add buffer data on an outer circumferential side of the predetermined amount of buffer data.

3 Claims, 14 Drawing Sheets

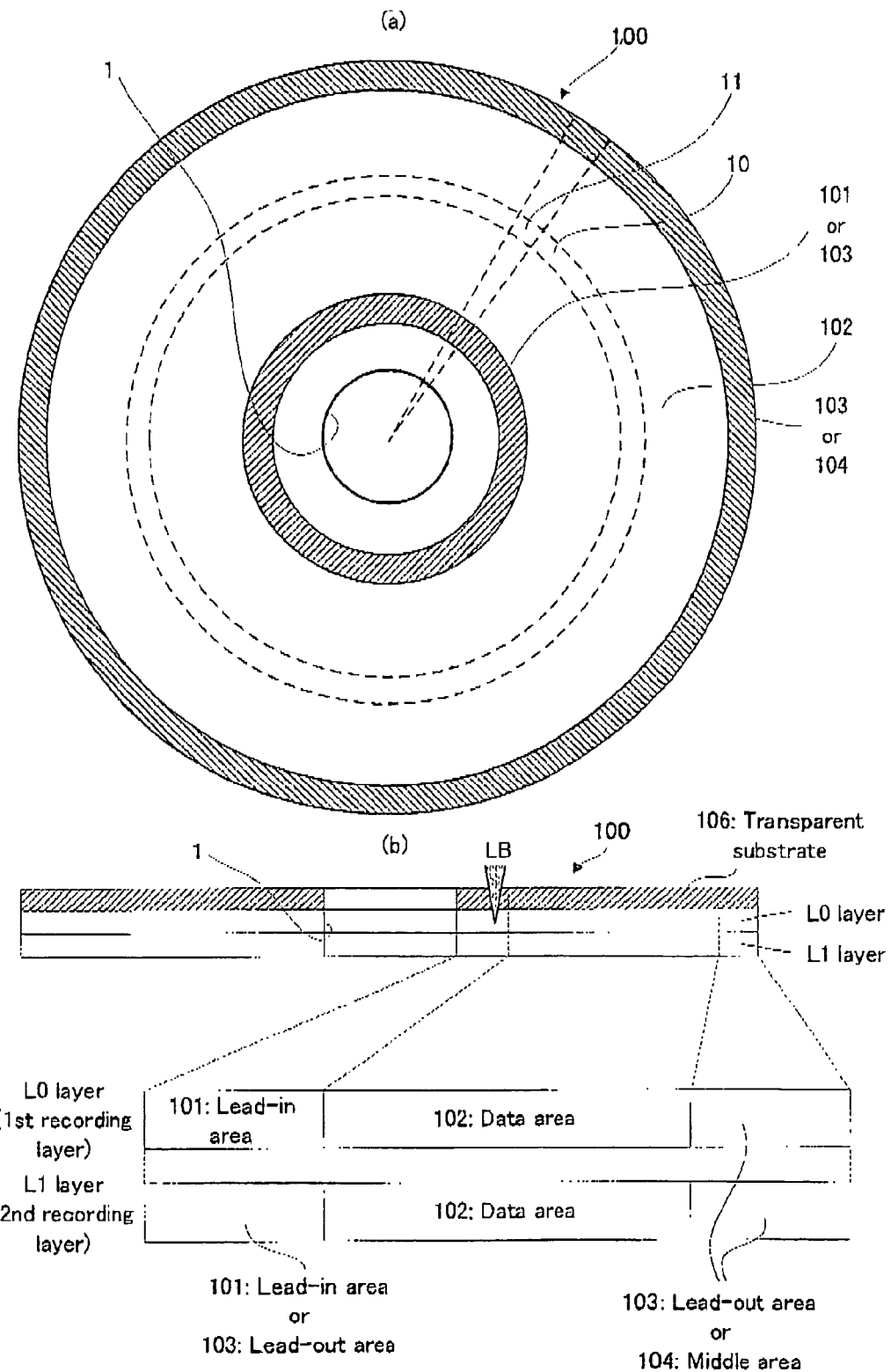

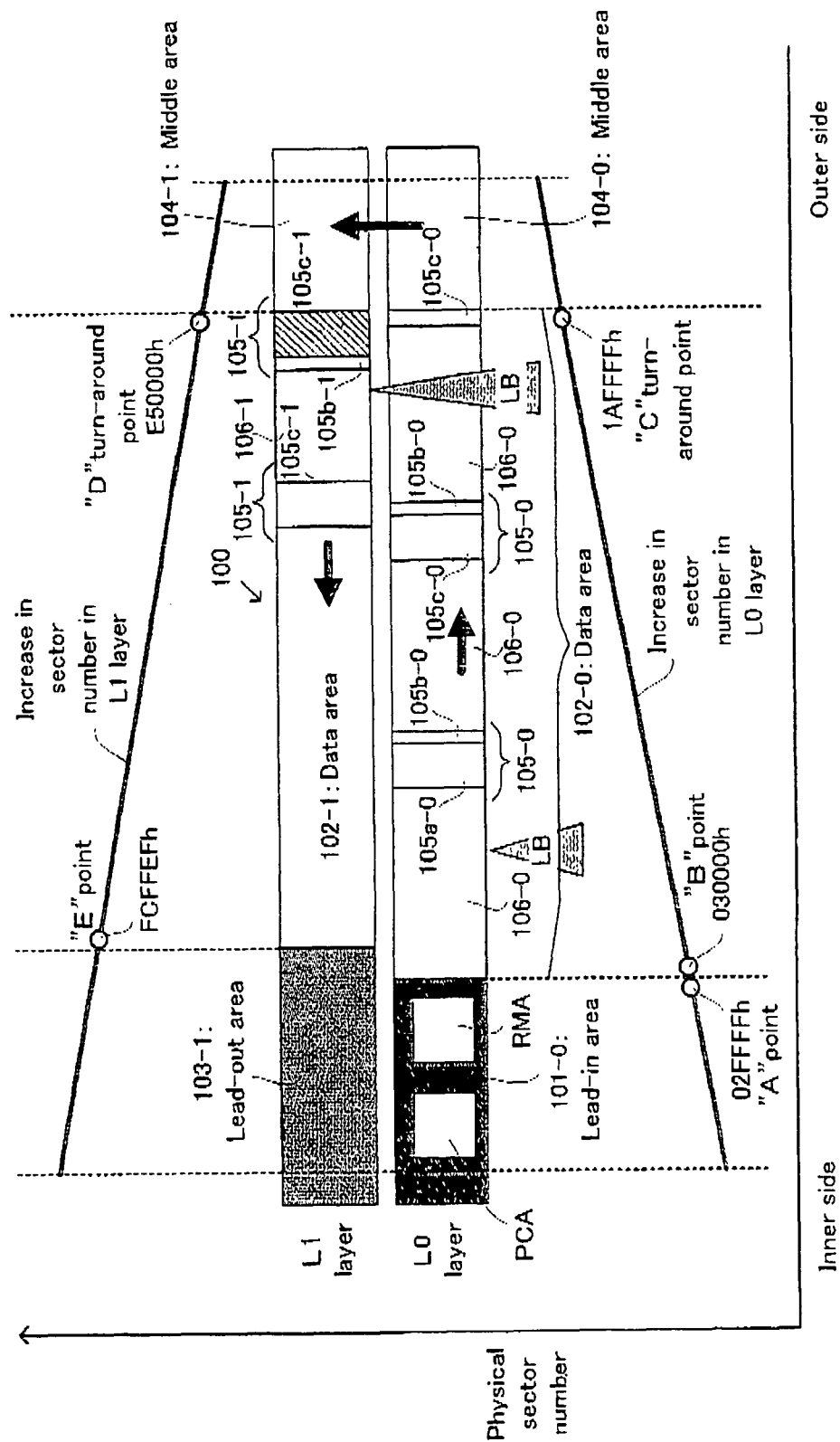
[FIG. 2]

[FIG. 3]

| Sector number of start position of border zone | 3FF00h~B25FFh (inner) | B2600h~1656FFh (middle) | 165700h~ (outer) |
|---|---|---|---|
| First border zone | 1792 ECC 56MBytes | 2368 ECC 74MB | 2944 ECC 92MB |
| Second or subsequent border zone | 384ECC 12MB | 480 ECC 15MB | 608 ECC 19MB |

[FIG. 4]
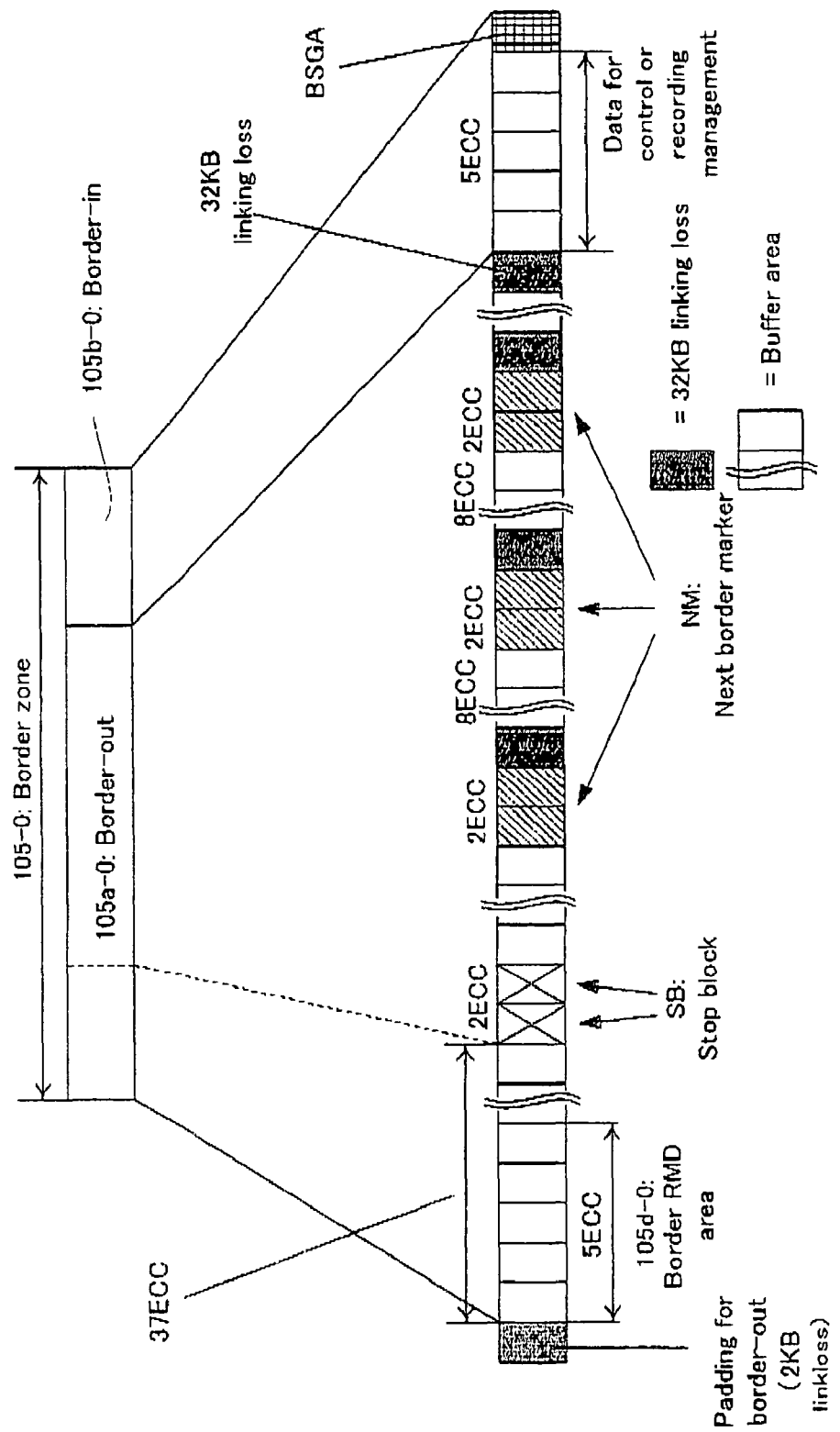

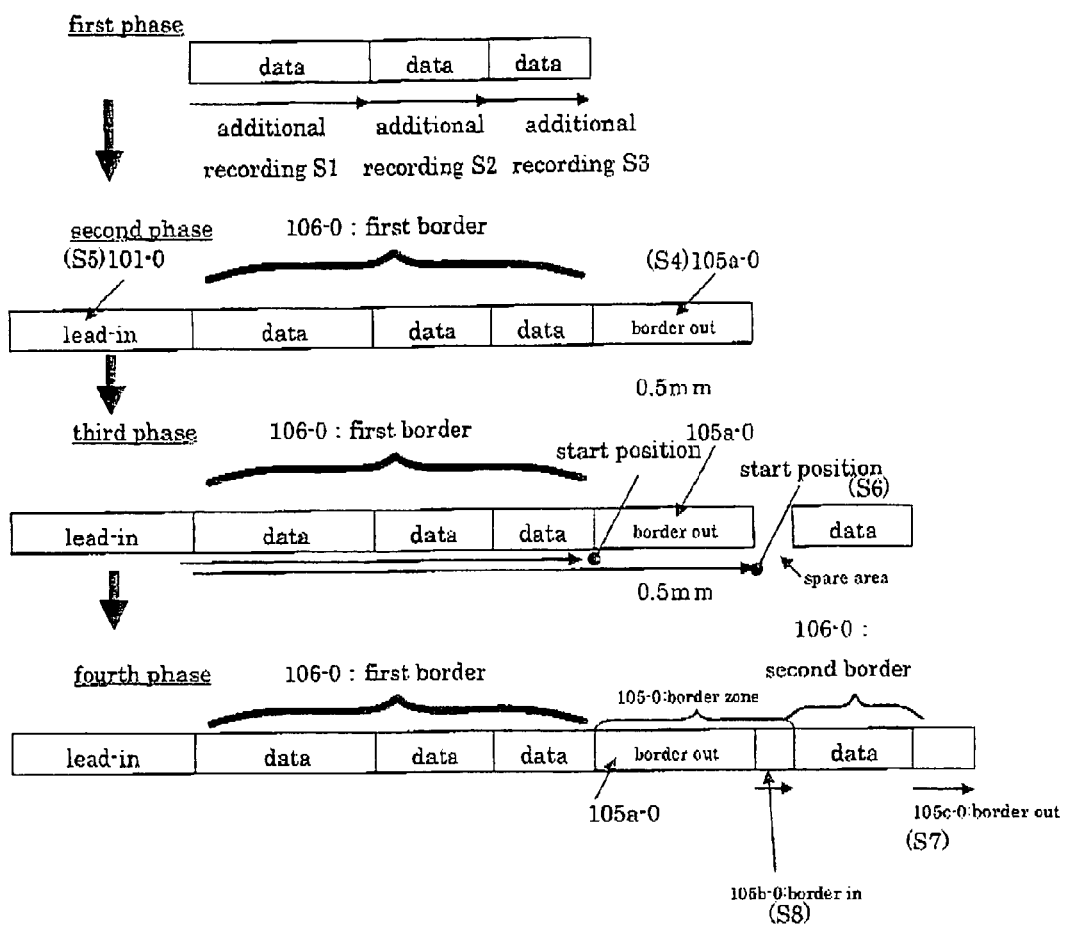

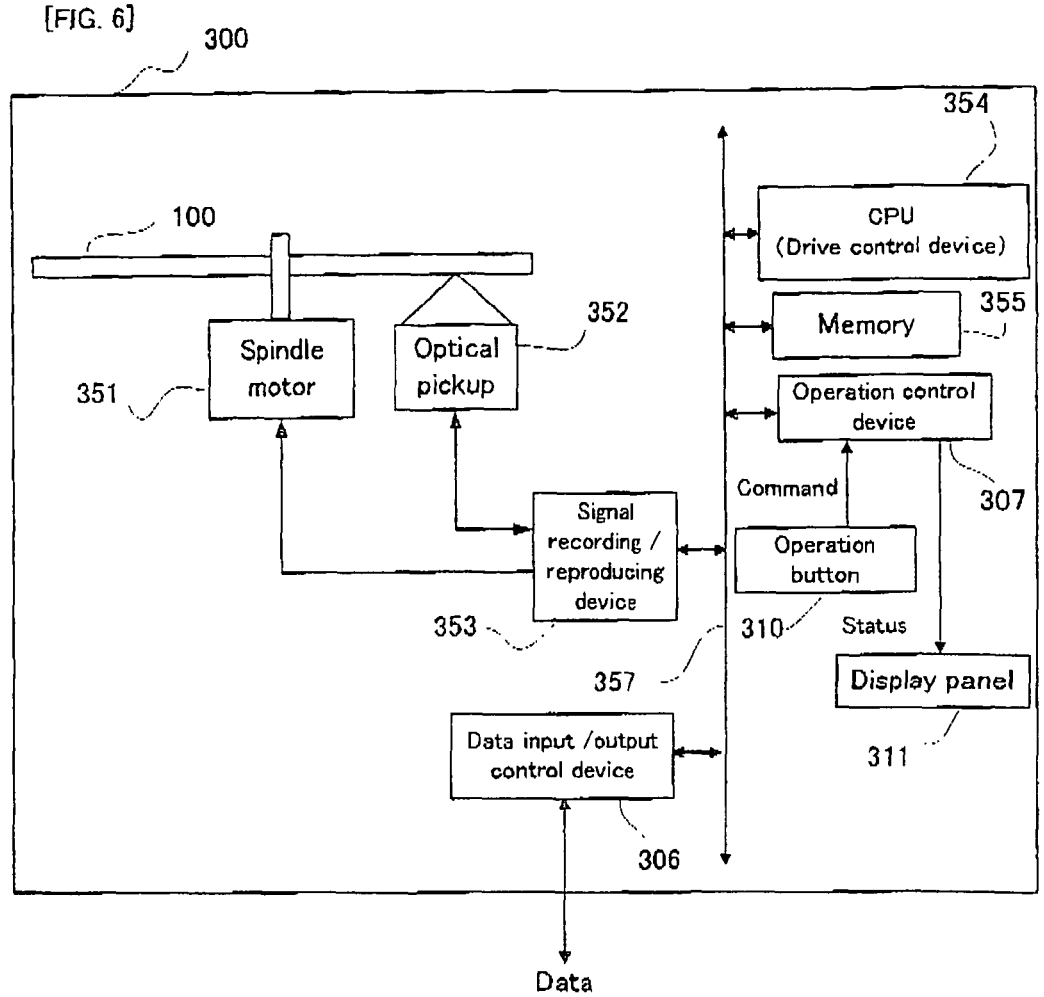
[FIG. 6]

[FIG. 7]
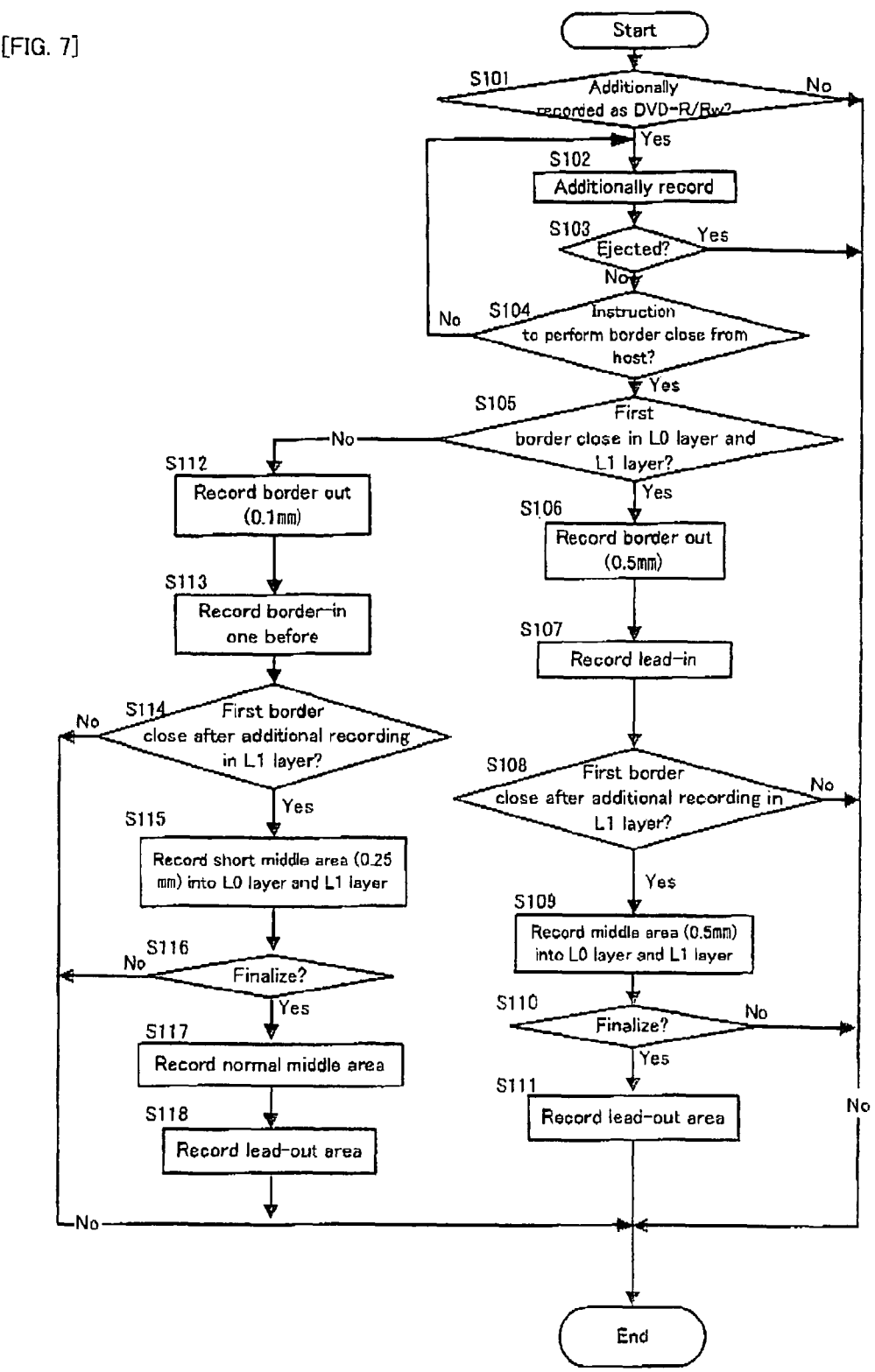

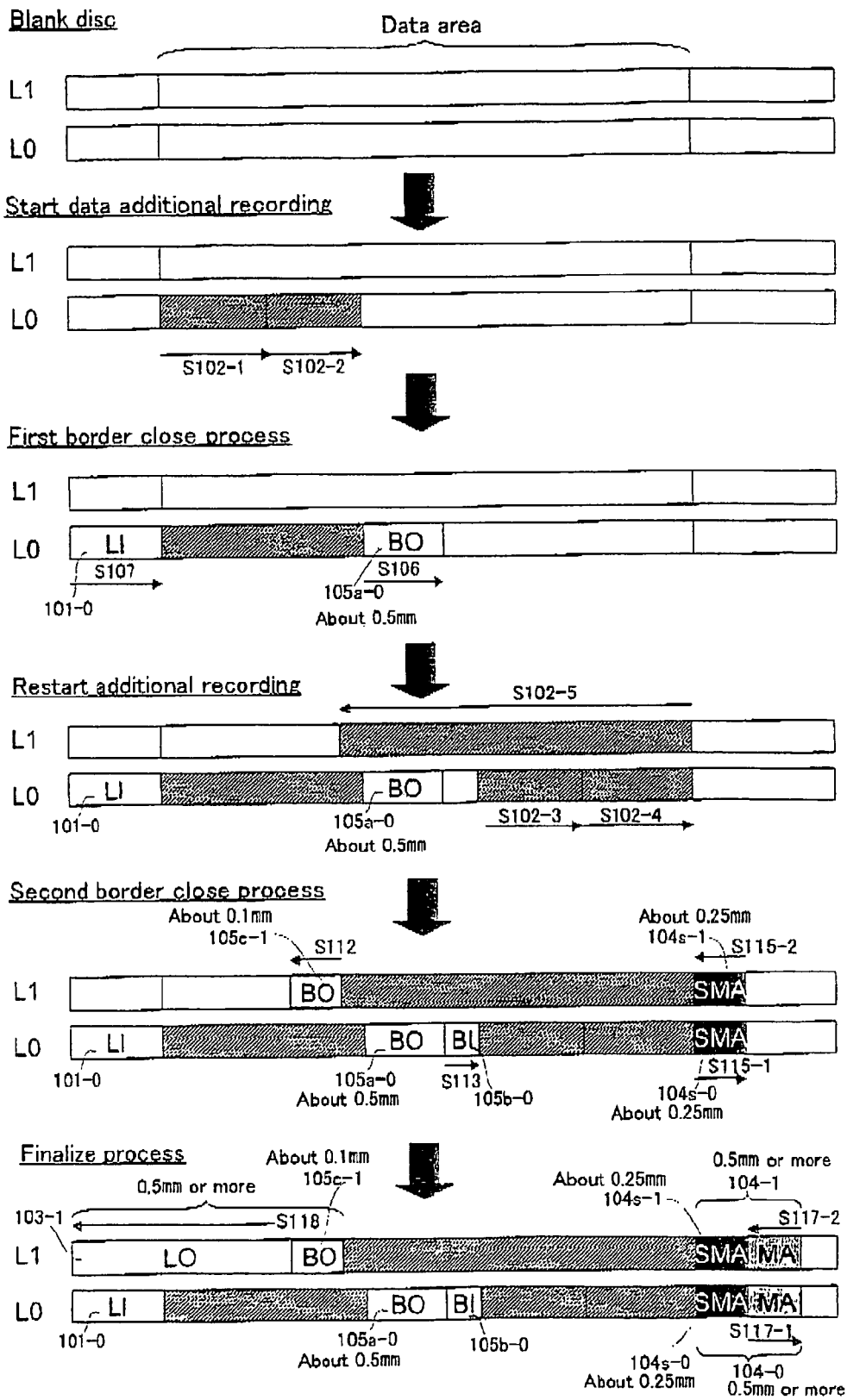

[FIG. 9]
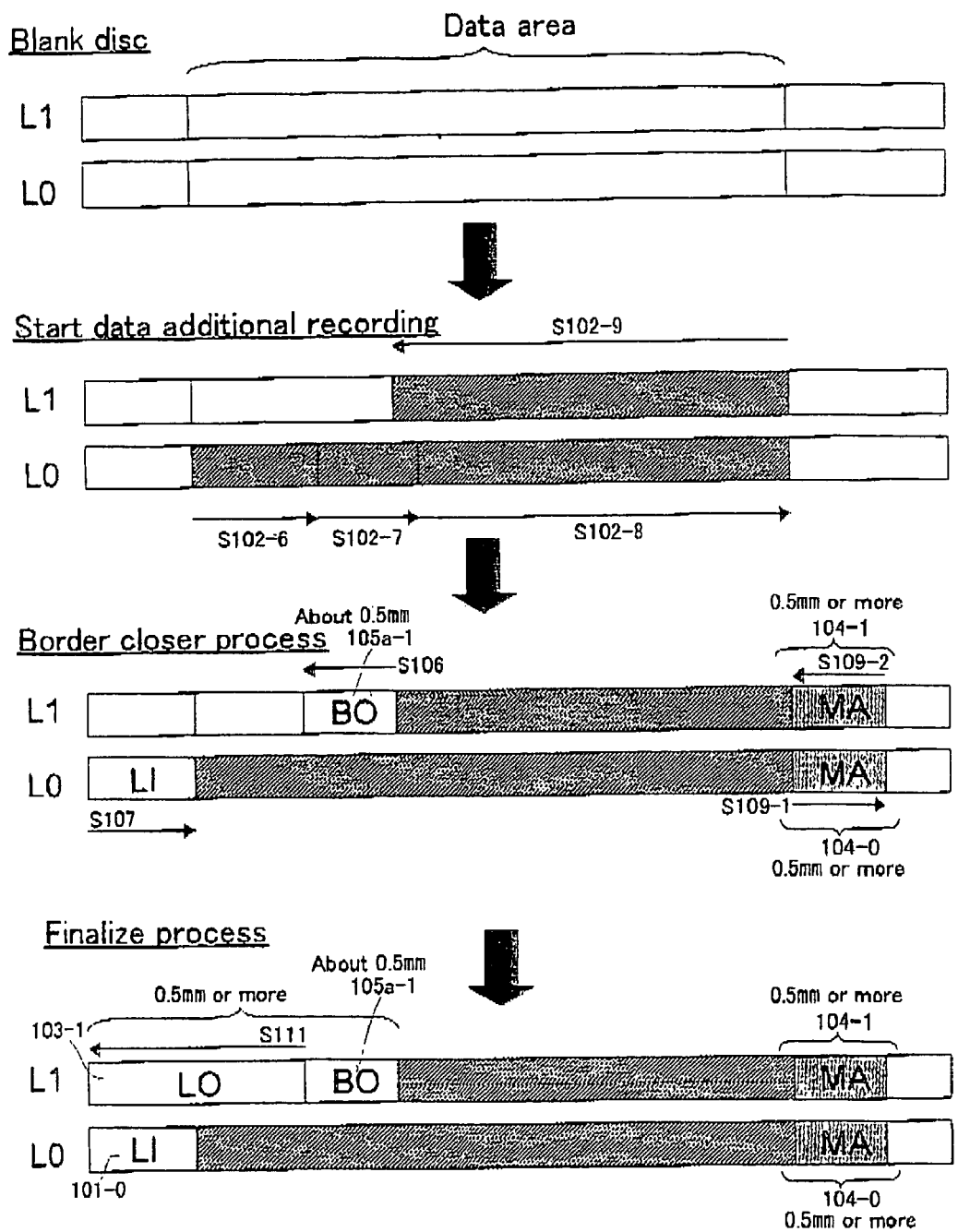

[FIG. 10]
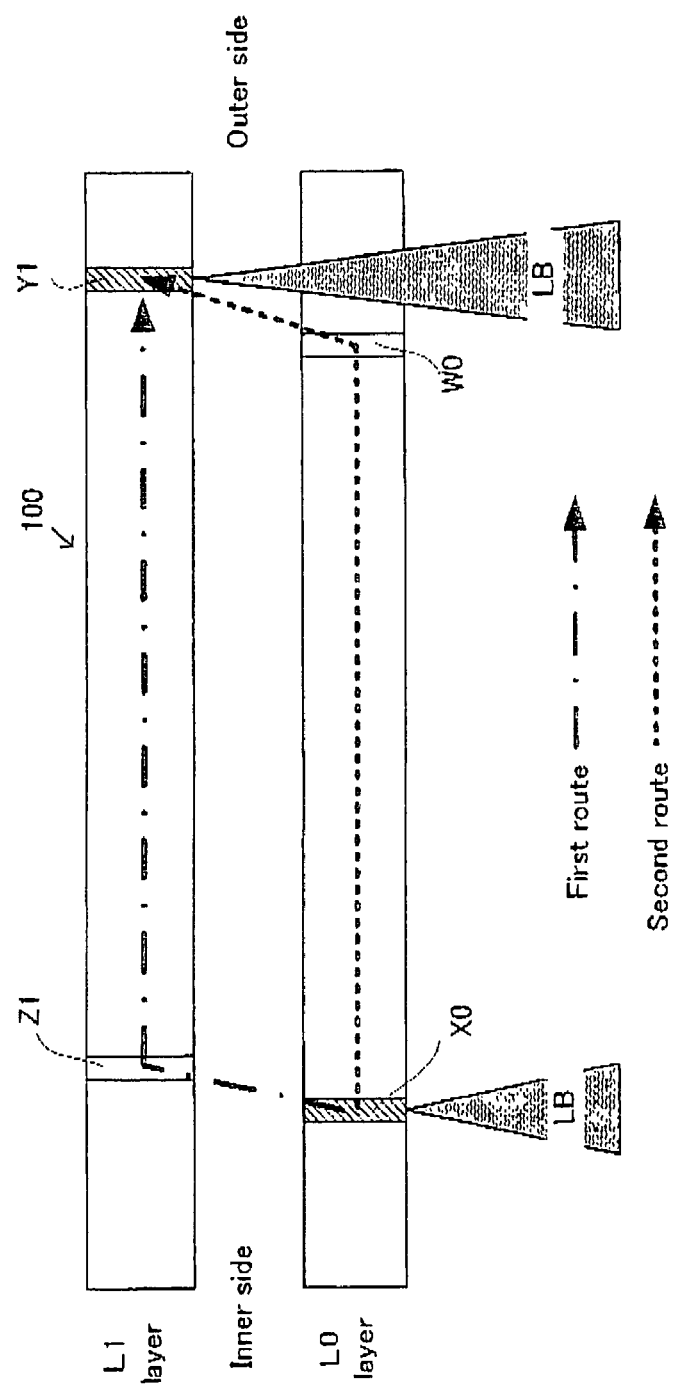

[FIG. 11]
(a)
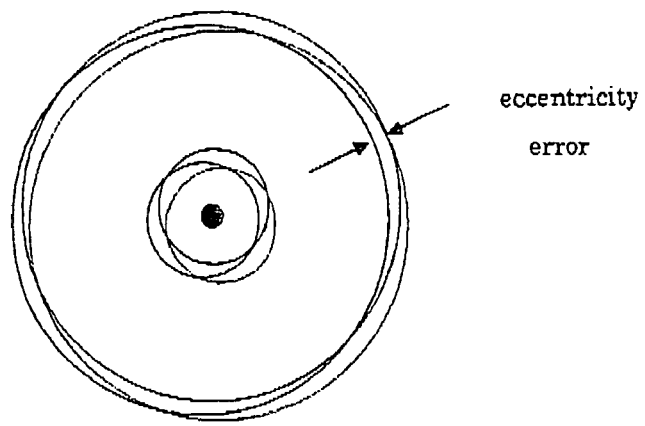
eccentricity error
(b)
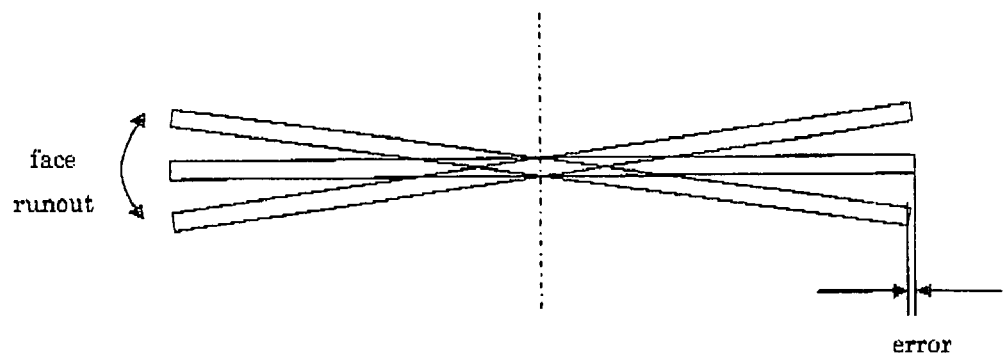
face runout
error
(c)
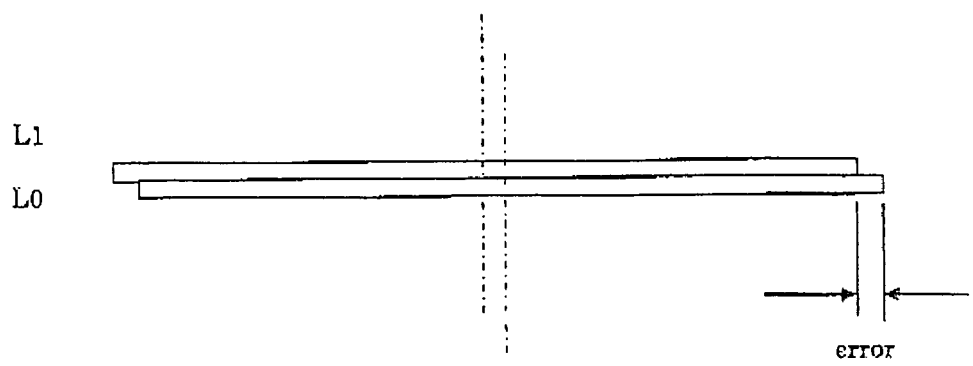
L1
L0
error

[FIG. 12]
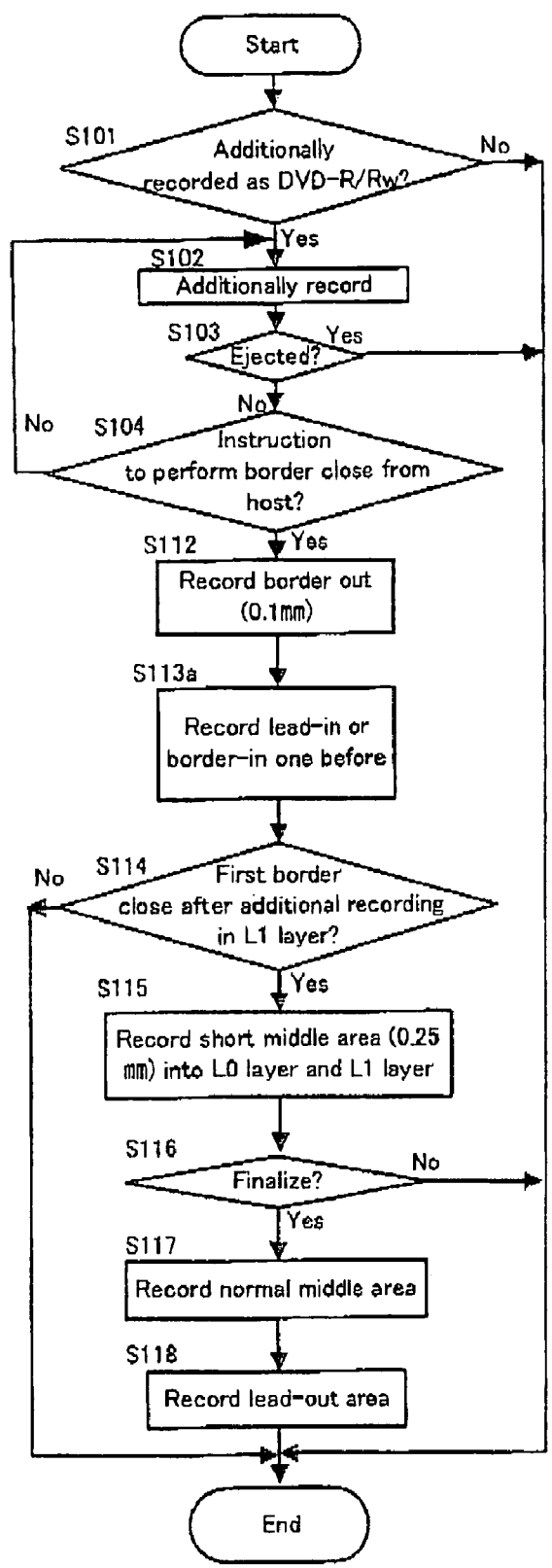

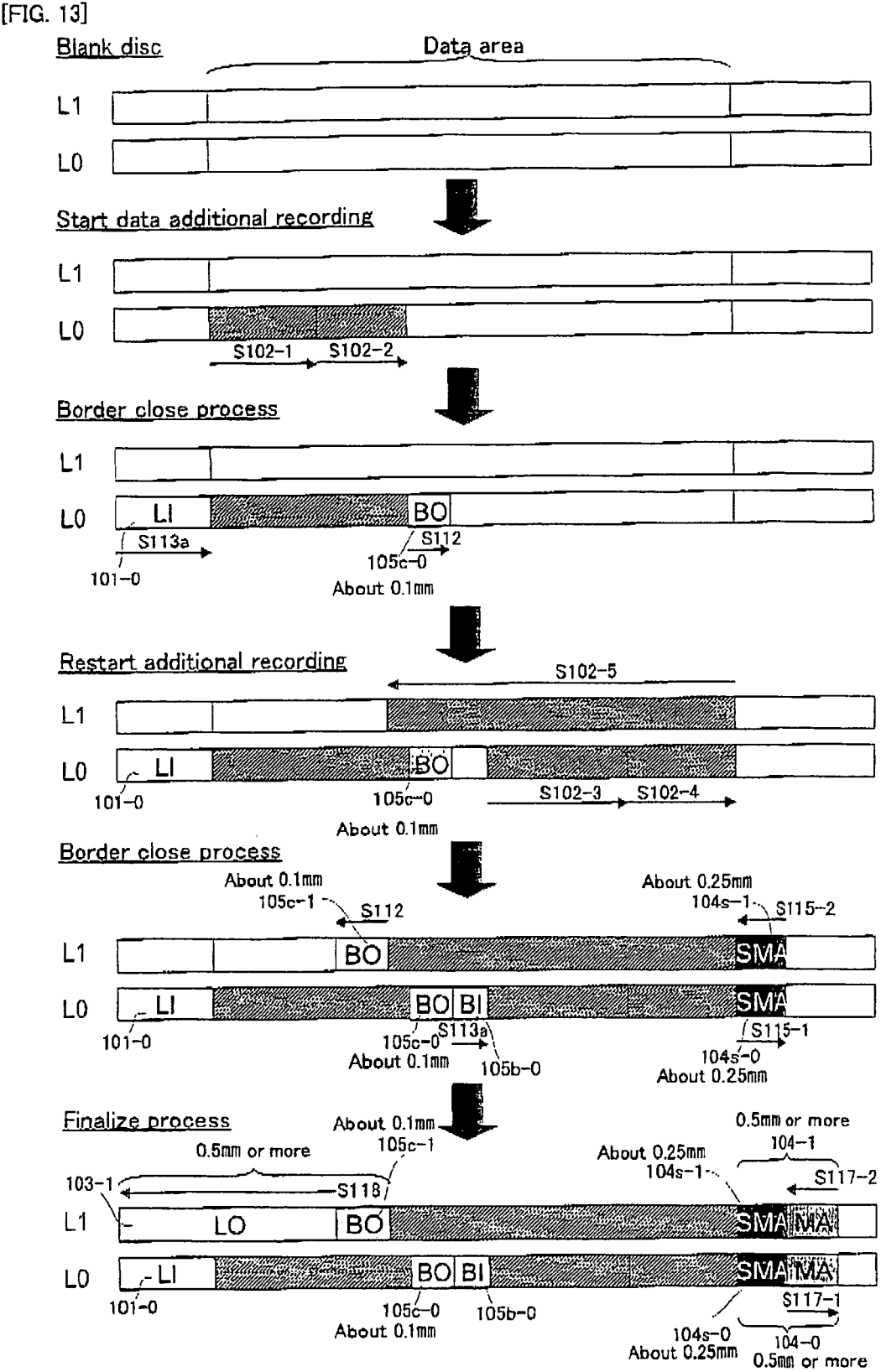

[FIG. 14]
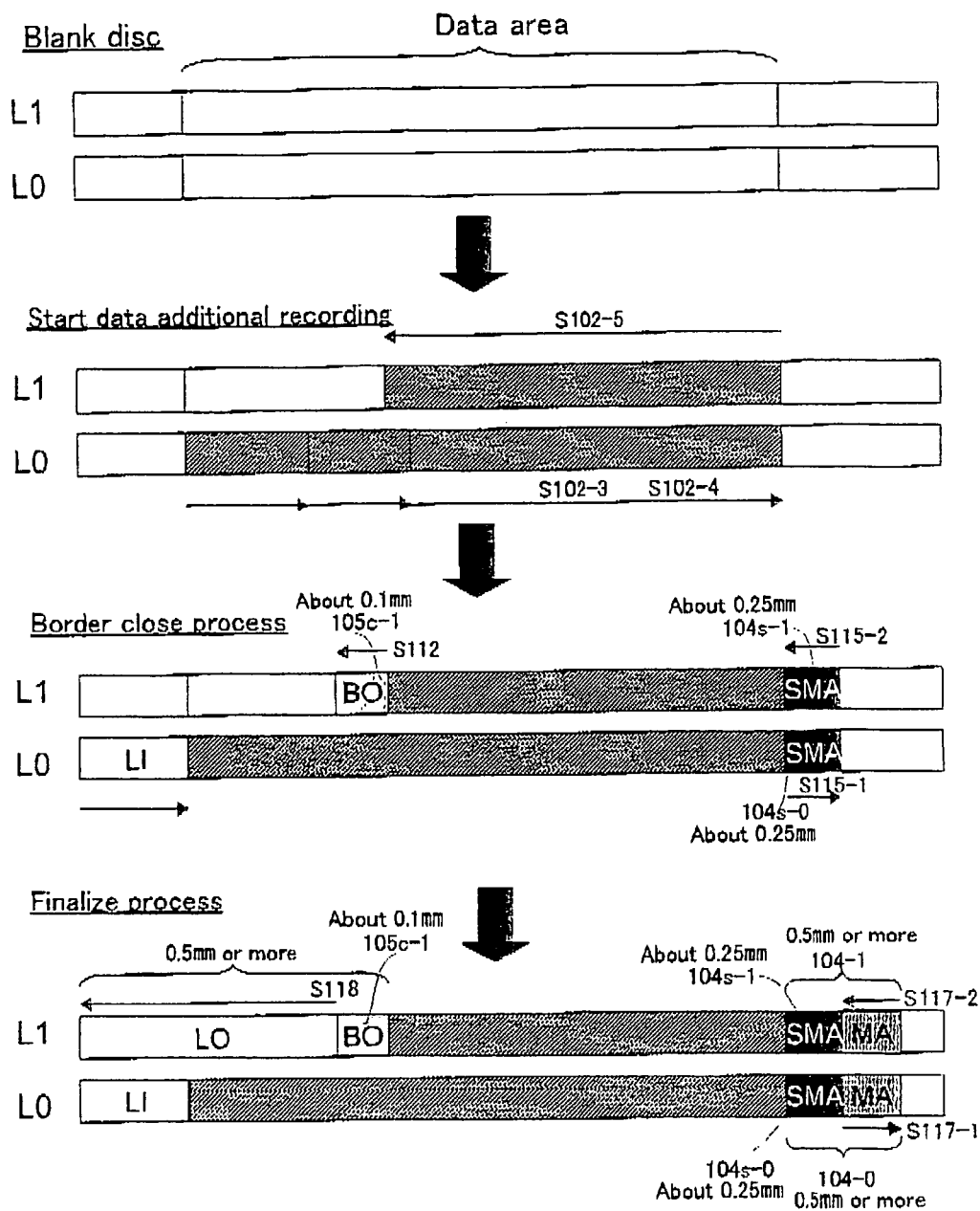

INFORMATION RECORDING DEVICE AND METHOD, AND COMPUTER PROGRAM

TECHNICAL FIELD

The present invention relates to an information recording apparatus, such as a DVD recorder, an information recording method, and a computer program.

BACKGROUND ART

In an information recording medium, such as a CD and a DVD, for example, as described in patent documents 1 and 2, etc., there is also developed an information recording medium, such as a multilayer type or dual layer type optical disc, in which a plurality of recording layers are stacked or bonded on the same substrate. Then, on an information recording apparatus, such as a DVD recorder, for performing the recording with respect to the dual layer type, i.e., two-layer type optical disc, laser light for recording is focused on a recording layer located on the front as viewed from the irradiation side of the laser light (hereinafter referred to as an "L0 layer", as occasion demands) to thereby record information into the L0 layer in an irreversible change recording method by heat or a rewritable method. Moreover, the laser light is focused on a recording layer located on the rear of the L0 layer as viewed from the irradiation side of the laser light (hereinafter referred to as an "L1 layer", as occasion demands), through the L0 layer or the like, to thereby record information into the L1 layer.

On the other hand, there is also disclosed a technology of performing the recording or reproduction in an "opposite method" or the like with respect to the L0 layer and the L1 layer. The "opposite method" herein is a recording or reproducing method in which track path directions are opposite between two recording layers, for example.

In the two-layer type optical disc adopting this opposite method, as described in a patent document 3, it is necessary to record a middle area, as a buffer area, in disc outer circumferential portions of the L0 layer and the L1 layer. This middle area plays the same role as a lead-out in the case of single-layer type media, and it is a buffer area for preventing an unrecorded area from being adjacently located just behind an information recorded-area.

In the same manner, as the buffer area, a border zone is recorded in some cases, in an optical disc of DVD-R/RW or the like, for example. The border zone herein is a buffer area for preventing an unrecorded area from being adjacently located just behind an area where information, such as data, is recorded, as in the case of the lead-out and the middle area. More specifically, the border zone has a structure prepared for a write-once method, such as multi session in a CD-R, even in a DVD-R. Incidentally, the recording process of the border zone is generally referred to as border close (process).

By recording such a buffer area to eliminate, in the DVD-R or the like, the unrecorded area adjacent to the data, it is possible to perform the normal control of tracking servo, by an optical pickup of a DVD-ROM reproduce-only drive which adopts a phase difference method or differential phase detection, with respect to a DVD-R drive which adopts a push-pull method as a tracking method.

As described above, by virtue of the presence of the middle area and the border zone, the DVD-ROM reproduce-only drive can accurately read the information on the optical disc of DVD-R/RW or the like, whose compatibility with the DVD-ROM is maintained.

Patent document 1: Japanese Patent Application Laying Open NO. 2000-311346
Patent document 2: Japanese Patent Application Laying Open NO. 2001-23237
Patent document 3: Japanese Patent Application Laying Open NO. 2000-503446
Patent document 4: Japanese Patent Application Laying Open NO. 2002-133667
Patent document 5: Japanese Patent Application Laying Open NO. 2003-59059
Patent document 6: Japanese Patent Application Laying Open NO. Hei 09-16966
Patent document 7: Japanese Patent Application Laying Open NO. 2001-23237

DISCLOSURE OF INVENTION

Subject to be Solved by the Invention

However, if the data is recorded over the L0 layer and the L1 layer, for example, in the case of the opposite method, it is necessary to record the middle area as the buffer area, in the outer circumferential portions of the L0 layer and the L1 layer, in order to maintain the compatibility with the two-layer type optical disc of general DVD-ROM. More specifically, in the general DVD-ROM, according to the standard thereof, it is necessary to record the buffer area with a length of at least 0.5 mm in the radial direction. The information amount of the buffer area corresponds to about 184 MB (=92 MB×2 layers), as described later, in the outer circumferential portions of the optical disc, and it takes about 2 to 3 minutes to perform the recording at one time speed (1385 (KB/sec)) defined by the DVD Forum.

As described above, there is such a technical problem that if the data is recorded over the L0 layer and the L1 layer, it is necessary to record the buffer area with a huge information amount, for a process in which the data on the disc can be reproduced on a DVD-ROM drive, i.e., so-called finalize, or the border close, which prolongs a time length for the recording process.

In order to solve the above-mentioned problem, it is therefore an object of the present invention to provide an information recording apparatus and an information recording method, which can efficiently record information into each recording layer of a multilayer type information recording medium and which can reduce a recording time length, as well as a computer program.

Means for Solving the Subject

In order to solve the above-mentioned object, an information recording apparatus according to claim 1 of the present invention is an information recording apparatus provided with: a writing device capable of writing record information onto an information recording medium provided with first and second recording layers; a first controlling device for controlling the writing device to continuously write the record information into the first and second recording layers; a second controlling device for controlling the writing device to write a predetermined amount of buffer data on an outer circumferential side of the record information written in the first and second recording layers; and a third controlling device for controlling the writing device to add buffer data on an outer circumferential side of the predetermined amount of buffer data.

In order to solve the above-mentioned object, an information recording method according to claim 4 of the present invention is an information recording method in an information recording apparatus provided with: a writing device capable of writing record information onto an information recording medium provided with first and second recording layers, the information recording method provided with: a first controlling process of controlling the writing device to continuously write the record information into the first and second recording layers; a second controlling process of controlling the writing device to write a predetermined amount of buffer data on an outer circumferential side of the record information written in the first and second recording layers; and a third controlling process of controlling the writing device to add buffer data on an outer circumferential side of the predetermined amount of buffer data.

In order to solve the above-mentioned object, a computer program according to claim 5 of the present invention is a computer program of instructions for recording control and for tangibly embodying a program of instructions executable by a computer provided in the information recording apparatus according to claim 1, to make the computer function as at least one portion of the writing device, and the first to third controlling devices.

BRIEF DESCRIPTION OF DRAWINGS

FIG. 1 are a substantial plan view (FIG. 1(a)) showing the basic structure of an optical disc having a plurality of recording areas, in a first example of the information recording medium of the present invention, and a schematic cross sectional view of the optical disc and a corresponding conceptual view (FIG. 1(b)) showing a recording area structure in the radial direction.

FIG. 2 is a conceptual graph showing the data structure of a two-layer type optical disc associated with the information recording medium which is a recording target of the first example of the information recording apparatus of the present invention, a physical sector number of sectors constituting an ECC block in the recording area of the optical disc, and a recording or reproducing method by an opposite method of the optical disc.

FIG. 3 is a table showing a physical information amount of a normal border zone in the L0 layer of the two-layer type optical disc, such as a DVD-R, which is the recording target of the first example of the information recording apparatus of the present invention.

FIG. 4 is a data structural view showing the detailed data structure of the normal border zone in the L0 layer of the two-layer type optical disc, such as a DVD-R, which is the recording target of the first example of the information recording apparatus of the present invention.

FIG. 5 is a schematic conceptual view showing a procedure of a border close process in the recording area of the optical disc, performed by an information recording/reproducing apparatus in the first example of the information recording apparatus of the present invention, with four phases.

FIG. 6 is a block diagram showing the information recording/reproducing apparatus in the first example of the information recording apparatus of the present invention.

FIG. 7 is a flowchart showing a flow of the recording operation of the optical disc in the case where a short middle area or a normal middle area is recorded on the information recording/reproducing apparatus in the first example of the information recording apparatus of the present invention.

FIG. 8 is a schematic conceptual view showing transition in the recording areas of the L0 layer and the L1 layer if the border close process in the L0 layer and the L1 layer, the recording of the short middle area, and a finalize process, which correspond to steps S101 to S108 and steps S112 to S118 in FIG. 7, are performed by one specific example of the information recording/reproducing apparatus in the first example of the information recording apparatus of the present invention.

FIG. 9 is a schematic conceptual view showing transition in the recording areas of the L0 layer and the L1 layer if the border close process in the L1 layer, the recording in the normal middle area, and the finalize process, which correspond to steps S101 to S111 in FIG. 7, are performed by another specific example of the information recording/reproducing apparatus in the first example of the information recording apparatus of the present invention FIG. 10 is a schematic conceptual view showing a route when the information recording/reproducing apparatus, such as a general DVD-ROM drive, accesses a desired address on the two-layer type optical disc.

FIG. 11 are schematic conceptual views showing four factors of an error between the desired address and an actually accessed position in the information recording/reproducing apparatus, such as a general DVD-ROM drive.

FIG. 12 is a flowchart showing a flow of the recording operation of the optical disc in the case where the short middle area is recorded on an information recording/reproducing apparatus in a second example of the information recording apparatus of the present invention.

FIG. 13 is a schematic conceptual view showing transition in the recording areas of the L0 layer and the L1 layer if the border close process in the L0 layer and the L1 layer, the recording of the short middle area, and the finalize process, which correspond to steps S101 to S118 in FIG. 12, are performed by one specific example of the information recording/reproducing apparatus in the second example of the information recording apparatus of the present invention.

FIG. 14 is a schematic conceptual view showing transition in the recording areas of the L0 layer and the L1 layer if the border close process in the L1 layer, the recording of the short middle area, and the finalize process, which correspond to steps S101 to S118 in FIG. 12, are performed by another specific example of the information recording/reproducing apparatus in the second example of the information recording apparatus of the present invention.

DESCRIPTION OF REFERENCE CODES

100 . . . Optical disc, 101-0 (101-1) . . . Lead-in area, 102-0 (102-1) . . . Data zone, 103-0 (103-1) . . . Lead-out area, 104-0 (104-1) . . . Middle area, 104s-0 (104s-1) . . . Short middle area, 105-0 (105-1) . . . Border zone, 105a-0 (105a-1) . . . Border-out (for 0.5 mm), 105b-0 (105-1) . . . Border-in, 105c-0 (105c-1) . . . Border-out (for 0.1 mm), 105d-0 (105d-1) . . . Border RMD area, 106 . . . Transparent substrate, 106-0 (106-1) . . . Border (Bordered area), 300 . . . Information recording/reproducing apparatus, 306 . . . Data input/output control device, 307 . . . Operation control device, 310 . . . Operation button, 311 . . . Display panel, 351 . . . Spindle motor, 352 . . . Optical pickup, 353 . . . Signal recording/reproducing device, 354 . . . CPU (drive control device), 355 . . . Memory, LB . . . Laser light Best Mode for Carrying Out the Invention Embodiment of Information Recording Apparatus Hereinafter, the information recording apparatus in an embodiment of the present invention will be explained.

An embodiment of the information recording apparatus of the present invention is an information recording apparatus provided with: a writing device capable of writing record information onto an information recording medium provided with first and second recording layers; a first controlling device for controlling the writing device to continuously write the record information into the first and second recording layers; a second controlling device for controlling the writing device to write a predetermined amount of buffer data on an outer circumferential side of the record information written in the first and second recording layers; and a third controlling device for controlling the writing device to add buffer data on an outer circumferential side of the predetermined amount of buffer data.

According to the embodiment of the information recording apparatus of the present invention, the information recording medium which is a target has at least the first recording layer (L0 layer) and the second recording layer (L1 layer), for example.

Upon the recording with respect to the information recording medium constructed in the above manner, the record information is recorded from the inner to the outer circumferential side of the first recording layer, by the writing device, such as an optical pickup, under the control of the first or second controlling device, such as a CPU, for example. Then, layer jump is performed, and the record information is recorded, with the recording direction reversed, from the outer to the inner circumferential side of the second recording layer.

Particularly in the embodiment, the writing device writes predetermined amount of buffer data on the outer circumferential side of the record information written in the first and second recording layers, under the control of the second controlling device. The predetermined amount of buffer data herein is dummy data with a length of about 0.1 mm in the radial direction, for example, having an information amount smaller than that of normal buffer data.

Moreover, according to the embodiment, the writing device adds buffer data on the outer circumferential side of the predetermined amount of buffer data, under the control of the third controlling device. The predetermined amount of buffer data written by this has a length of about 0.5 mm in the radial direction, and this is how to form a normal middle area in the first and second recording layers.

As described above, in continuously recording the record information into the first and second recording layers, it is unnecessary to record huge amount of buffer data, so that it is possible to record real-time data without stopping for a long time, like video recording, for example.

In one aspect of the embodiment of the information recording apparatus of the present invention, the second controlling device responds to a first border close instruction after the record information is recorded over the first and second recording layers.

According to this aspect, under the control of the second controlling device, the writing device writes predetermined amount of buffer data on the outer circumferential side of the record information written in the first and second recording layers, as one portion of buffer areas of the first and second recording layers, for example, in response to an instruction to perform the border close process when or immediately after a plurality of record information to be recorded is written over both the first and second recording layers. Thus, it is possible to reproduce the record information on a general DVD-ROM reproduce-only drive.

By this, it is possible to form a so-called provisional middle area, in arbitrary timing to perform the border close process.

In another aspect of the embodiment of the information recording apparatus of the present invention, the third controlling device responds to a finalize instruction.

According to this aspect, under the control of the third controlling device, the writing device adds buffer data on the outer circumferential side of the predetermined amount of buffer data, in response to a second instruction to perform the finalize process when or immediately after the last record information out of the plurality of record information to be recorded is written. In addition, with regard to the optical disc, such as a two-layer type DVD-R, on which the finalize process is performed, its compatibility (or the optical disc's compatibility) with the standard of a DVD-ROM disc is maintained, and reproduction can be performed on a general DVD-ROM reproduce-only drive.

By this, it is possible to form the normal middle area in a shorter time length, in arbitrary timing to perform the finalize process.

Embodiment of Information Recording Method

Hereinafter, the information recording method in an embodiment of the present invention will be discussed.

An embodiment of the information recording method of the present invention is an information recording method in an information recording apparatus provided with: a writing device capable of writing record information onto an information recording medium provided with first and second recording layers, the information recording method provided with: a first controlling process of controlling the writing device to continuously write the record information into the first and second recording layers; a second controlling process of controlling the writing device to write a predetermined amount of buffer data on an outer circumferential side of the record information written in the first and second recording layers; and a third controlling process of controlling the writing device to add buffer data on an outer circumferential side of the predetermined amount of buffer data.

According to the embodiment of the information recording method of the present invention, as in the case of the information recording apparatus of the present invention, predetermined amount of buffer data with an information amount smaller than that of the normal buffer data is recorded by the writing device into one portion of the buffer areas of the first and second recording layers, under the control of the second controlling process. Thus, it is possible to greatly reduce a time length required for the border close process when or immediately after a plurality of record information to be recorded is written over both the first and second recording layers. In addition, with regard to the optical disc, such as a two-layer type DVD-R, on which the finalize process is performed by the writing device under the control of the third controlling process, its compatibility (or the optical disc's compatibility) with the standard of a DVD-ROM disc is maintained, and reproduction can be performed on a general DVD-ROM reproduce-only drive.

As described above, in continuously recording the record information into the first and second recording layers, it is unnecessary to record huge amount of buffer data, so that it is possible to record real-time data without stopping for a long time, like video recording, for example.

Incidentally, in response to the various aspects of the embodiment of the information recording apparatus of the present invention, the embodiment of the information recording method of the present invention can also adopt various aspects.

Embodiment of Computer Program

Hereinafter, the computer program in an embodiment of the present invention will be discussed.

An embodiment of the computer program of the present invention is a computer program of instructions for recording control and for tangibly embodying a program of instructions executable by a computer provided in the above-mentioned embodiment of the information recording apparatus of the present invention (including its various aspects), to make the computer function as at least one portion of the writing device, and the first to third controlling devices.

According to the embodiment of the computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the information recording apparatus of the present invention described above, the computer program of the present invention can also adopt various aspects.

These effects and other advantages of the present invention become more apparent from the following examples.

As explained above, according to the information recording apparatus and method of the present invention, they are provided with: the writing device; the first controlling device and process; the second controlling device and process; and the third controlling device and process. Thus, it is possible to greatly reduce a time length required for the formation of the buffer area (middle area) to be formed on the disc outer circumferential side, in continuously recording a plurality of record information to be recorded into the first and second recording layers, for example.

EXAMPLES

First Example of Information Recording Apparatus

Next, with reference to FIG. 1 to FIG. 11, a detailed explanation will be given for the structure and the operation of the first example of the information recording apparatus in the present invention, and an information recording medium which is a recording target of the information recording apparatus of the present invention.
(Information Recording Medium)

Next, with reference to FIG. 1 to FIG. 5, a detailed explanation will be given for the information recording medium which is a recording target of the first example of the information recording apparatus of the present invention.

At first, with reference to FIG. 1, the basic structure of an optical disc in the first example of the information recording medium of the present invention will be explained. FIG. 1(*a*) is a substantial plan view showing the basic structure of the optical disc having a plurality of recording areas, in the first example of the information recording medium of the present invention, and FIG. 1(*b*) is a schematic cross sectional view of the optical disc and a corresponding conceptual view showing a recording area structure in the radial direction.

As shown in FIG. 1(*a*) and FIG. 1(*b*), an optical disc 100 has a recording surface on a disc main body with a diameter of about 12 cm, as is a DVD. On the recording surface, the optical disc 100 is provided with: a lead-in area 101; a data area 102; and a lead-out area 103 or a middle area 104, centered on a center hole 1. Then, for example, on a transparent substrate 106 of the optical disc 100, there are laminated or stacked recording layers. In each recording area of the recording layers, a track or tracks 10, such as a groove track and a land track, are alternately placed, spirally or concentrically, with the center hole 1 as the center. Moreover, on the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101 or the lead-out area 103 does not exist, a data structure explained below can be constructed. Moreover, as described later, the lead-in area 101, the lead-out area 103 or the middle area 104 may be further segmentized.

In particular, the optical disc 100 in the example, as shown in FIG. 1(*b*), has such a structure that the L0 layer and the L1 layer, which constitute one example of the "first and second recording layers" of the present invention as descried later, respectively, are laminated or stacked on the transparent substrate 106. Upon the recording/reproduction of such a two-layer type optical disc 100, the recording/reproduction in the L0 layer or the L1 layer is performed, depending on which recording layer has the focus position of laser light LB, irradiated from the upper side to the lower side in FIG. 1(*b*). Moreover, the optical disc 100 in the example is not limited to a two-layer single sided type, i.e., a dual layer type, but may be a two-layer double sided type, i.e., a dual layer double sided type. Furthermore, the optical disc 100 in the example is not limited to the optical disc having the two recording layers, as described above, but may be an optical disc of a multilayer type which has three or more layers. Incidentally, a recording/reproduction procedure in the opposite method on the two-layer type optical disc and the data structure of each layer will be described later.

Next, with reference to FIG. 2, an explanation will be given for the data structure of the two-layer type optical disc associated with the information recording medium which is a recording target of the first example of the information recording apparatus of the present invention, a physical sector number of sectors constituting an ECC block in the recording area of the optical disc, and a recording or reproducing procedure in the opposite method of the optical disc. The physical sector number (hereinafter referred to as a "sector number") herein is position information which indicates an absolute physical address in the recording area of the optical disc. Moreover, FIG. 2 is a conceptual graph showing the data structure of the two-layer type optical disc associated with the information recording medium which is a recording target of the first example of the information recording apparatus of the present invention, the physical sector number of sectors constituting an ECC block in the recording area of the optical disc, and the recording or reproducing method by an opposite method of the optical disc. The vertical axis indicates the sector number expressed by a hexadecimal number, and the horizontal axis indicates a relative position in the radial direction of the optical disc.

As shown in FIG. 2, the two-layer type optical disc 100 which is the recording target of the first example of the information recording apparatus of the present invention is provided with: the above-mentioned transparent substrate; and the two recording layers stacked or laminated on the transparent substrate, i.e. the L0 layer and the L1 layer.

Specifically, the L0 layer is provided with: a lead-in area 101-0; a data area 102-0; and a middle area 104-0, from the inner to the outer circumferential side. The lead-in area 101-0 id provided with: a PC (Power Calibration) area PCA for an OPC (Optimum Power Calibration) process, an RM (Recording Management) area RMA in which recording management information is recorded, and the like. Incidentally, the PCA and the RMA may be located on the disc inner circumferential side of the lead-in area 101. In particular, the data area 102-0 is provided with three bordered areas 106-0 (hereinafter referred to a "border", as occasion demands), for example, by a border zone 105-0 and a border-out 105a-0 or 105c-0. Each border zone 105-0 is provided with: the border-out 105a-0 with a length of 0.5 mm in the radial direction (or 105c-0 with a length of 0.1 mm in the radial direction) and a border-in 105b-0, as described later.

On the other hand, the L1 layer is provided with: a middle area 104-1; a data area 102-1; and a lead-out area 103-1, from the outer to the inner circumferential side. A not-illustrated OPC area or the like may be also located in the lead-out area 103-1. In particular, the data area 102-1 is also provided with: a border zone 105-1; and a border-out 105c-1, from the outer circumferential side, for example, and is provided with a border 106-1 between them. Each border zone 105-1 is provided with: a border-out 105a-1 with a length of 0.5 mm in the radial direction (or 105c-1 with a length of 0.1 mm in the radial direction) and a border-in 105b-1, as in the L0 layer.

Since the two-layer type optical disc is constructed in the above manner, upon the recording or reproduction of the optical disc 100, the laser light LB is irradiated from a not-illustrated substrate's side, i.e., from the lower to the upper side in FIG. 2, by a not-illustrated optical pickup of an information recording/reproducing apparatus in the first example of the information recording apparatus of the present invention, and the focal distance thereof or the like is controlled as well as the travel distance and direction in the radial direction of the optical disc 100. By this, the data is recorded into each recording layer, or the recorded data is reproduced.

In particular, the opposite method is adopted as the recording or reproducing procedure of the two-layer type optical disc associated with the information recording medium which is the recording target of the first example of the information recording apparatus of the present invention. More specifically, the opposite method herein is such a method that the optical pickup of the information recording/reproducing apparatus in the first example is displaced from the inner to the outer circumferential side, i.e. in a direction of a right-pointing arrow in FIG. 2, in the L0 layer as the recording or reproducing procedure of the two-layer type optical disc, while the optical pickup is displaced from the outer to the inner circumferential side, i.e. in a direction of a left-pointing arrow in FIG. 2, in the L1 layer, to thereby perform the recording or reproduction on the two-layer type optical disc. In the opposite method, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner. This is why the opposite method is adopted in the recording of large volumes of real time content information, such as video data.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer, by which the recording or reproduction is performed in the L0 layer. Incidentally, in the example, "h" at the tail of "30000h" or the like indicates that it is expressed by the hexadecimal number. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), and the end position of the data area 102-1 with a sector number of "FCFFEFh" (refer to an E point in FIG. 2), and the optical pickup is displaced to the lead-out area 103-1, by which the recording or reproduction is performed in the L1 layer.

All the sector numbers in the L0 layer and the L1 layer explained above have a 15's complement number relationship in the hexadecimal number. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal number to a binary number of "000110101111111111111111", inverting the bits to "111001010000000000000000", and reconverting it to the "E50000h" in the hexadecimal number.

Thus, the content information is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned, one to one. More specifically, for example, a "000000" LBA corresponds to the sector number of "030000h", and a "30FFEF" LBA corresponds to the sector number of "FCFFEFh".

Next, with reference to FIG. 3, an explanation will be given for the physical information amount of the normal border zone on the two-layer type optical disc, such as a DVD-R, which is the recording target of the first example of the information recording apparatus of the present invention. FIG. 3 is a table showing the physical information amount of the normal border zone in the L0 layer of the two-layer type optical disc, such as a DVD-R, which is the recording target of the first example of the information recording apparatus of the present invention.

As shown in FIG. 3, the columns in the horizontal direction show the sector numbers which indicate, from the left, the start positions of the border zones corresponding to the inner circumferential portion, the middle portion, and the outer circumferential portion in the radial direction of the optical disc. The rows in the vertical direction show, from the top, the information amount of the border zone recorded for the first time and the information amount of the border zone recorded for the second or subsequent time, by using the number of ECC blocks and the number of bytes. The information amount of the normal border zone varies depending on the start position to be recorded. If it is recorded for the first time, a border zone relatively long in the radial direction is recorded. On the other hand, if it is recorded for the second or subsequent time, a border zone relatively short in the radial direction is recorded.

Specifically, the length in the radial direction of the border zone recorded for the first time is defined to be about 0.5 mm, and that the length in the radial direction of the border zone recorded for the second or subsequent time is defined to be about 0.1 mm. More specifically, as shown on the table in FIG. 4, in the normal border close process after a sector number of "165700h" in the recording area of the optical disc, the information amount of the border zone recorded for the first time is "2944" ECC blocks and "92" MB. On the other hand, the information amount of the border zone recorded for the second or subsequent time is "608" ECC blocks and "19" MB. Discussing this in detail, the reason why the border zone recorded for the first time is set to be 0.5 mm is to recognize the first border, formed by the border zone recorded for the first time, even by a DVD-ROM reproduce-only drive (hereinafter referred to as a "multi border non-supporting drive", as occasion demands) which is produced in the beginning and which cannot recognize the multi border structure of the optical disc, for example. More specifically, the multi border non-supporting drive is basically designed to recognize the buffer area, such as the lead-out area, which is defined to have a minimum value of about 0.5 mm in length in the radial direction. If the buffer area is set to be smaller than this, there is a possibility that the recording or reproduction position where the optical pickup is located upon the recording or reproduction is beyond the buffer area and out of the substrate. By setting the length of the buffer area to be about 0.5 mm, as described above, even the multi border non-supporting derive can reproduce the information in the data area which is from the lead-in area to the border zone recorded for the first time (a so-called first bordered area, and for short, a border), as in the normal DVD-ROM. As described above, mixing 0.5 mm and 0.1 mm is advantageous in the point that a time length for the border close process can be reduced, as compared to the case where the border zone is all defined to have 0.5 mm in length.

Next, with reference to FIG. 4, the detailed data structure of the normal border zone on the two-layer type optical disc, such as a DVD-R, which is the recording target of the information recording/reproducing apparatus in the first example of the information recording apparatus of the present invention will be discussed. FIG. 4 is the data structural view showing the detailed data structure of the normal border zone in the L0 layer of the two-layer type optical disc, such as a DVD-R, which is the recording target of the first example of the information recording apparatus of the present invention.

As shown in FIG. 4, the normal border zone 105-0 (105-1; hereinafter, a numerical reference in round brackets indicates the one in the L1 layer) is provided with: the border-out 105*a*-0 (105*a*-1) or 105*c*-0 (105*c*-1); and the border-in 105*b*-0 (105*b*-1). The information amount of the normal border zone is, for example, "2944" ECC blocks (for 0.5 mm described above) or "608" ECC blocks (for 0.1 mm described above).

In the border-in 105*b*-0 (105*b*-1), the newest data for control or recording management with an information amount of "5" ECC blocks is recorded. The data structure of the data for control or recording management is the same as that of the data for control or recording management recorded in the lead-in area. Incidentally, a BSGA (Block SYNC Guard Area) disposed in the last position of the border-in 105*b*-0 (105*b*-1) is recorded in order to guarantee that if the data for control or recording management in the border-in is unrecorded, a next recorded ECC block adjacent thereto can be reproduced.

The border-out 105*a*-0 (105*a*-1) or 105*c*-0 (105*c*-1) is further provided with: a border RMD area 105*d*-0; a stop block RB; three next border markers NM; and a buffer area including buffer data.

In the border RMD area 105*d*-0, the newest data for recording management, such as RMD (Recording Management Data), is copied and recorded by the information amount of "5" ECC blocks. The border RMD area 105*d*-0 can provide management information or the like for reproducing the information recorded in the border, for a DVD-ROM reproduce-only drive which cannot read a RM area in the lead-in area of a DVD-R, for example.

The stop block SB has an information amount of "2" ECC blocks, and is located in the 38th and 39th positions from the start position of the border-out 105*a*-0 (105*a*-1) or 105*c*-0 (105*c*-1). The attribute of the area of the stop block SB is the same as that of the lead-out area. The purpose is to make the optical pickup recognize the same area as the lead-out area and to prevent the runaway of the optical pickup.

Each of the next border markers NM has an information amount of "2" ECC blocks, and by virtue of the next border marker NM, it is possible to judge whether or not there is a next border. Specifically, if there is not a next border and the lead-out area is not recorded yet, the next border marker NM of the border-out located in the last position is unrecorded. Then, in the border close process, for example, "00h" is recorded into each next border marker NM of the border-out located in the second position from the end. Then, in a finalize process, for example, padding of "00h" is performed in each next border marker NM of the border-out located in the end, and the attribute of each next border NM area is set to be equal to that of the lead-out area. Incidentally, in the case of a DVD-RW, there is no next border marker NM.

Next, with reference to FIG. 5, an explanation will be given for the procedure of a general border close process in the recording area of the optical disc, performed by an information recording/reproducing apparatus in the first example of the information recording apparatus. FIG. 5 is a schematic conceptual view showing the procedure of the border close process in the recording area of the optical disc, performed by the information recording/reproducing apparatus in the first example of the information recording apparatus of the present invention, with four phases. Incidental, for easy understanding, FIG. 5 shows the border close process in the L0 layer in the case where the recording is not performed over the two recording layers.

At first, as shown in a first phase in FIG. 5, information, such as data, is additionally recorded or written once by a DVD-R recording drive, for example, from the left to the right (from the disc inner circumferential side to the outer circumferential side), for each sector. This type of recording method is referred to as a sequential recording method (refer to a step S1, step S2, and step S3 in FIG. 5).

Next, as shown in a second phase in FIG. 5, in response to an instruction from a host computer, for example, the border close process is performed on the DVD-R recording drive, in order to make it possible to read the information on the optical disc by a ROM reproduce-only drive. Specifically, after the recording of the border-out 105*a*-0 (step S4), the management information or the like is recorded into the lead-in area 101-0 (step S5). More specifically, in addition to the physical sector number or the like which indicates the position information about a position at which the border-out 105a-0 starts, the position information about a position at which the next border-in 105b-0 starts is recorded in the lead-in area 101-0. Incidentally, since this is the first border close process, the border-out 105a-0 with a length of 0.5 mm in the radial direction is recorded (refer to the explanation for FIG. 3, described above).

Consequently, the first border (bordered area) 106-0 on the optical disc in the second phase can be read by all the DVD-ROM reproduce-only drives including the multi border non-supporting drive, for example.

Next, as shown in a third phase in FIG. 5, information, such as data, is additionally recorded or written once by the DVD-R recording drive, in a step S6, for each sector. Specifically, in this step, a space is made for an area into which the border-in 105b-0 is recorded in a next forth phase, and additional or postscript recording is performed.

Consequently, on the optical disc in the third phase, only the information, such as data, in the first border 106-0 in which the first border close process is completed can be recognized by the DVD-ROM reproduce-only drive.

Next, as shown in the fourth phase in FIG. 5, the second border close process is performed, in order to make it possible to read the information, additionally recorded or written once in the step S6 in the third phase, by the DVD-ROM reproduce-only drive. Incidentally, since this is the border close process which is performed for the second or subsequent time, the border-out 105c-0 with a length of 0.1 mm in the radial direction is recorded (step S7). At the same time, the border-in 105b-0 is recorded in the space area in the third phase (step S8).

Consequently, on the optical disc in the fourth phase, the information, such as data, in the areas of the first border 106-0 and the second border 106-0 can be read by the DVD-ROM reproduce-only drive which can recognize the multi border structure of the optical disc (hereinafter referred to as a "multi border supporting drive", as occasion demands).

(Information Recording/Reproducing Apparatus in First Embodiment of Information Recording Apparatus)

Next, with reference to FIG. 6, the structure of an information recording/reproducing apparatus 300 in the first embodiment of the information recording apparatus of the present invention will be discussed in detail. FIG. 6 is a block diagram showing the information recording/reproducing apparatus in the first embodiment of the information recording apparatus of the present invention. Incidentally, the information recording/reproducing apparatus 300 has a function of recording the record data onto the optical disc 100 and a function of reproducing the record data recorded on the optical disc 100.

With reference to FIG. 6, the inner structure of the information recording/reproducing apparatus 300 will be explained. The information recording/reproducing apparatus 300 is an apparatus for recording information onto the optical disc 100 and reading the information recorded on the optical disc 100, under the control of a CPU (Central Processing Unit).

The information recording/reproducing apparatus 300 is provided with: the optical disc 100; a spindle motor 351; an optical pickup 352; a signal recording/reproducing device 353; a CPU (drive control device) 354; a memory 355; a data input/output control device 306; an operation control device 307; an operation button 310; a display panel 311; and a bus 357.

In particular, a disc drive (hereinafter referred to as a drive, as occasion demands) may be constructed from the spindle motor 351; the optical pickup 352; the signal recording/reproducing device 353; the CPU (drive control device) 354; and the memory 355, described in the former half. Moreover, the host computer (hereinafter referred to as a host, as occasion demands) of the present invention may be constructed from the data input/output control device 306; the operation control device 307; the operation button 310; and the display panel 311, described in the latter half. Alternatively, the communication device of the present invention may be constructed from the CPU (drive control device) 354 and the bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC (Optimum Power Calibration) process. In particular, the signal recording/reproducing device 353 constitutes one example of the "writing device" of the present invention, together with the optical pickup 352.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer used for compression/decompression of video data; a RAM area into which a parameter required for the operation of a program or the like is stored; and the like.

The CPU (drive control device) 354 is connected to the signal recording/reproducing device 353 and the memory 355 through the bus 357, and controls the entire information recording/reproducing apparatus 300 by giving an instruction to each controlling device. In general, software or firmware for operating the CPU 354 is stored in the memory 355. In particular, the CPU 354 is one specific example of the "controlling device" and the "judging device" of the present invention. In particular, the CPU 354 constitutes one example of the "first, second, and third controlling devices" of the present invention.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354, and outputs the operation state of the information recording/reproducing apparatus 300, such as during recording and during reproduction, to the display panel 311, such as a fluorescent tube. In particular, in the embodiment, the operation control device 307 may be provided with a not-illustrated CPU and memory or the like, as the host computer of the present invention.

One specific example of the information recording/reproducing apparatus 300, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

(Flow of Recording Operation by One Specific Example of First Embodiment of Information Recording Apparatus)

Next, with reference to FIG. 7 and FIG. 8, an explanation will given for (i) a flow of the recording operation if the border close process in the L0 layer and the L1 layer, the recording of a short middle area, and the finalize process are performed, by one specific example of the information recording/reproducing apparatus in the first embodiment of the information recording apparatus of the present invention, and (ii) transition in the recording areas of the L0 layer and the L1 layer. The "short middle area" herein means a buffer area in a so-called provisional state, in which the predetermined amount of buffer data of the present invention is recorded, before it becomes a fully completed buffer area through the finalize process, such as a formation process of the middle area. More specifically, in the first recording layer such as L0 layer, the record information, such as contents, is recorded, and continuously, the predetermined amount of buffer data is written as the short middle area of the L0 layer. Then, after layer jump from the short middle area of the L0 layer to the L1 layer, the predetermined amount of buffer data is written as the short middle area of the L1 layer, and continuously, a plurality of record information is recorded in the L1 layer. Alternatively, if the record information, such as contents, is recorded in the first recording layer such as L0 layer, and continuously in the L1 layer, a plurality of record information is recorded in the L1 layer after the layer jump from the L0 layer to the L1 layer, the short middle area of each layer may be recorded in response to an instruction from the host computer such that the record data can be reproduced on a reproduce-only ROM drive.

By virtue of such construction, in recording the data, such as video data, which requires real-time features, it is possible to record it over the layers almost without interrupting the recording operation, and it is also possible to avoid a problem of buffer overflow or the like. Moreover, if the record information, such as contents, is recorded in the first recording layer such as L0 layer, and continuously in the L1 layer, a plurality of record information is recorded in the L1 layer after the layer jump from the L0 layer to the L1 layer, the short middle area may be recorded, by using a spare time or idle time in which the operation of the drive is stopped, for example, even if there is no instruction from the host computer such that the record data can be reproduced on the reproduce-only ROM drive. By virtue of such construction, it is possible to reduce a recording time length of recording the buffer area, accompanied by the border close or the like.

Moreover, FIG. 7 is a flowchart showing a flow of the recording operation of the optical disc in the case where the short middle area or the normal middle area is recorded on the information recording/reproducing apparatus in the first example of the information recording apparatus of the present invention. Moreover, FIG. 8 is a schematic conceptual view showing transition in the recording areas of the L0 layer and the L1 layer if the border close process in the L0 layer and the L1 layer, the recording of the short middle area, and the finalize process, which correspond to steps S101 to S108 and steps S112 to S118 in FIG. 7, are performed by one specific example of the information recording/reproducing apparatus in the first example of the information recording apparatus of the present invention. Incidentally, in FIG. 8, the right side indicates the outer circumferential side and the left side indicates the inner circumferential side.

At first, in FIG. 7, if the optical disc 100 is loaded or inserted, a seek operation is performed by the optical pickup 352 under the control of the CPU 354. Then various management information necessary for a recording process with respect to the optical disc 100 is obtained, and at the same time, it is judged whether or not the user data or the like is additionally recorded or written once, with the optical disc 100 as a DVD-R/RW, for example (step S101). If the additional recording is performed onto the optical disc 100 (the step S101: Yes), the additional recording by the information recording/reproducing apparatus is performed by a unit of sector or ECC block, in the L0 layer, for example (step S102). Incidentally, refer to step S102-1 and step S102-2 in FIG. 8. Then, it is judged whether or not the optical disc is ejected (step S103). If the optical disc is not ejected (the step S103: No), it is further judged whether or not an instruction is given from the host to perform the border close process (step S104). If the instruction is given to perform the border close process (the step S104: Yes), it is further judged whether or not it is the first border close process for the optical disc. In other words, it is judged whether or not it is the first border close process in the L0 layer and the L1 layer (step S105). Here, if it is the first border close process (the step S105: Yes), the border-out 105a-0 with a length of about 0.5 mm in the radial direction is recorded (step S106). More specifically, "2944" ECC blocks (refer to the outer circumferential portion in FIG. 3) are recorded into the L0 layer, for example.

Then, the management information or the like is recorded into the lead-in area 101-0 (step S107). More specifically, in addition to the position information, such as the physical sector number, which indicates the information about a start position at which the border-out 105a-0 is recorded, the position information about a start position at which the next border-in 105b-0 will be recorded, is recorded into the lead-in area 101-0. Incidentally, refer to step S106 and step S107 in a phase of the first border close process in FIG. 8.

Then, it is judged whether or not the border close process in the step S106 and the step S107 is the first border close process performed in the L1 layer (step S108). Here, if it is not the first border close process performed in the L1 layer (the step S108: No), a series of sequential recording is stopped.

Then, through the above-mentioned step S101 to step S104, the additional recording by the information recording/reproducing apparatus is performed by the unit of sector or ECC block, for example, in the L0 layer and he L1 layer, for example. Incidentally, refer to step S102-3 to step S102-5 in phase of restart of the additional recording in FIG. 8.

Then, in the above-mentioned step S105, it is judged whether or not it is the first border close process for the optical disc. Here, if it is not the first border close process (the step S105: No), the border-out 105c-0 with a length of about 0.1 mm in the radial direction is recorded (step S112). More specifically, "608" ECC blocks (refer to the outer circumferential portion in FIG. 3) are recorded, for example. Then, the border-in 105b-0 is recorded just behind or after the normal border-out 105a-0 previously recorded (step S113). Incidentally, refer to step S112 and step S113 in a phase of the second border close process in FIG. 8.

Then, it is judged whether or not the border close process in the step S112 and the step S113 is the first border close process performed in the L1 layer (step S114). Here, if it is the first border close process performed in the L1 layer (the step S114: Yes), the short middle areas 104s-0 and 104s-1 with a length of about 0.25 mm in the radial direction are respectively recorded in the L0 layer and the L1 layer, respectively (step S115). Incidentally, refer to step S115-1 and step S115-2 in the phase of the second border close process in FIG. 8.

Then, it is judged whether or not an instruction is given from the host to perform the finalize process, on the drive (step S116). Here, if the instruction is given to perform the finalize process (the step S116 Yes), buffer data is further added into the short middle areas (length in the radial direction: 0.25 mm) in the L0 layer and the L1 layer in the step S115, to thereby form the normal middle areas with a length of about 0.5 mm or more in the radial direction (step S117). Incidentally, refer to step S117-1 and step S117-2 in a phase of the finalize process in FIG. 8.

Then, buffer data is added into the border-out 105c-1 (length in the radial direction: 0.1 mm) recorded in the last position of the L1 layer in the step S112, to thereby form the lead-out area with a length of about 0.5 mm or more in the radial direction, in the L1 layer (step S118). Incidentally, refer to step S118 in the phase of the finalize process in FIG. 8.

On the other hand, as a result of the judgment in the step S104, if the instruction is not given to perform the border close process (the step S104: No), the additional recording by the information recording/reproducing apparatus is performed by the unit of sector or ECC block or the like, for example, in the L0 layer and the L1 layer, for example (the step S102).

On the other hand, if the additional recording is not performed with respect to the optical disc 100 as a result of the judgment in the step S101 (the step S101; No), if the optical disc 100 is ejected as a result of the judgment in the step S103 (the step S103: Yes), if it is not the first border close process performed in the L1 layer as a result of the judgment in the step S108 and the step S114 (the step S108 and the step S114: No), and if the instruction is not given to perform the finalize process as a result of the judgment in the step S110 and the step S116 (the step S110 and the step S116: No), a series of sequential recording is stopped.

By this, a series of sequential recording is ended.

As described above, by virtue of the process of one specific example of the information recording/reproducing apparatus in the first example of the information recording medium of the present invention, explained in FIG. 7 and FIG. 8, the buffer data with an information amount smaller than that of the normal buffer data is recorded as the short middle area with a length of about 0.25 mm in the radial direction, into the L0 layer and the L1 layer, in the border close process when or immediately after a plurality of record information to be recorded is written over both the L0 layer and the L1 layer. By this, it is possible to greatly reduce a time length required for the border dose process. Specifically, the information amount of the buffer data with a predetermined amount of a relatively small information amount recorded in the L0 layer and the L1 layer corresponds to about a half of the information amount of the normal buffer data. Thus, the recording time length thereof can be also reduced to about half. More specifically, the information amount of the buffer data which is smaller than that of the normal buffer data corresponds to a total length of about 0.5 mm (0.25 mm×2) in the radial direction, in the outer circumferential portion of the optical disc, for example, and it is about 92 MB (=46 MB×2), as described above. Thus, the recording time length at one-time speed (1385 (KB/sec)) defined by the DVD Forum is about 1 minute and 6 seconds.

(Flow of Recording Operation by Another Specific Example of First Embodiment of Information Recording Apparatus)

Next, with reference to FIG. 7 and FIG. 9, an explanation will given for (i) a flow of the recording operation if the border close process in the L1 layer, the recording of the normal middle area, and the finalize process are performed, by another specific example of the information recording/reproducing apparatus in the first embodiment of the information recording apparatus of the present invention, and (ii) transition in the recording areas of the L0 layer and the L1 layer. FIG. 9 is a schematic conceptual view showing the transition in the recording areas of the L0 layer and the L1 layer if the border close process in the L1 layer, the recording in the normal middle area, and the finalize process, which correspond to the steps S101 to S111 in FIG. 7, are performed by another specific example of the information recording/reproducing apparatus in the first example of the information recording apparatus of the present invention. Incidentally, in FIG. 9, as in FIG. 8, the right side indicates the outer circumferential side and the left side indicates the inner circumferential side.

Through the judgment of whether or not it is the first border close process for the optical disc, the additional recording of data, and the border dose process in the above-mentioned steps S101 to S107, the additional recording by the information recording/reproducing apparatus is performed by the unit of sector or ECC block, for example, in the L0 layer and the L1 layer, for example. Then, the border-out 105a-1 with a length of about 0.5 mm in the radial direction is recorded into the L1 layer. Then, the management information or the like is recorded into the lead-in area 101-0. Incidentally, refer to step S102-6 to step S102-9 in a phase of start of the data additional recording, and step S106 and step S107 in a phase of the border close process, in FIG. 9.

Then, it is judged whether or not the border close process in the step S106 and the step S107 is the first border close process performed in the L1 layer (the step S108). Here, if it is the first border close process performed in the L1 layer (the step S108: Yes), the normal middle areas with a length of about 0.5 mm in the radial direction are recorded into the L0 layer and the L1 layer (step S109). Incidentally, refer to step S109-1 and step S109-2 in the phase of the border close process in FIG. 9. Incidentally, the reason to record the middle area with a normal length is that the length of the first border-out should be set to 0.5 mm according to the standard so that a multi border non-supporting model can correctly read the first border.

Then, it is judged whether or not an instruction is given from the host to perform the finalize process, on the drive (step S110). Here, if the instruction is given to perform the finalize process (the step S10: Yes), buffer data is further added into the border-out 105a-1 (length in the radial direction: 0.5 mm) recorded in the last position of the L1 layer in the step S106, to thereby form the lead-out area with a length of about 0.5 mm or more in the radial direction, in the L1 layer (step S111). Incidentally, refer to step S111 in a phase of the finalize process in FIG. 9.

By this, a series of sequential recording is ended.

As described above, by virtue of the process of another specific example of the information recording/reproducing apparatus in the first example of the information recording medium of the present invention, explained in FIG. 7 and FIG. 9, the normal buffer data is recorded as the normal middle area with a length of about 0.5 mm in the radial direction, into the L0 layer and the L1 layer, because of the normal control of tracking servo by the optical pickup of the DVD-ROM reproduce-only drive which does not support the multi border, in the case where the border zone is not recorded into the L0 layer even once, in the border close process when or immediately after a plurality of record information to be recorded is written over both the L0 layer and the L1 layer.

With regard to the optical disc, such as a two-layer type DVD-R on which the border close process is performed in the above manner, the reproduction can be performed on the multi-border non-supporting DVD-ROM drive, in addition to a multi-border supporting ROM drive.

As described above, by virtue of the entire process of the information recording/reproducing apparatus in the first example of the information recording medium of the present invention, explained in FIG. 7 to FIG. 9, the short middle area and the normal buffer data are appropriately separated and uses, and recorded. By this, it is possible to record the information onto the optical disc, such as a two-layer type DVD-R/RW, efficiently, in such a condition that the compatibility with a DVD-ROM is maintained. More specifically, it is possible to greatly reduce a time length required for the border close process when or immediately after a plurality of record information to be recorded is written over both the L0 layer and the L1 layer. Moreover, by performing the finalize process, it is possible to provide the optical disc, such as a two-layer type DVD-R, with the compatibility with a two-layer type DVD-ROM disc according to the standard.

Next, with reference to FIG. 10 and FIG. 11, an explanation will be given for the length in the radial direction of the short middle area and factors which influence the length, by the first example of the information recording apparatus of the present invention. FIG. 10 is a schematic conceptual view showing a route when the information recording/reproducing apparatus, such as a general DVD-ROM drive, accesses a desired address on the two-layer type optical disc. FIG. 11 are schematic conceptual views showing four factors of an error between the desired address and an actually accessed position in the information recording/reproducing apparatus, such as a general DVD-ROM drive.

On the information recording/reproducing apparatus in the first example of the information recording apparatus of the present invention, the buffer data with an information amount smaller than that of the normal buffer data is recorded into the L0 layer and the L1 layer such that the length in the radial direction of the short middle area is about 0.25 mm, for example. This is because in addition to the length in the radial direction of about 0.1 mm to function as the buffer area, the length of a margin, about 0.15 mm, for example, due to errors caused by various factors is added, which results in about 0.25 mm. More specifically, in the second or subsequent border close process of the optical pickup of the existing DVD-ROM reproduce-only drive, the length in the radial direction of the buffer area necessary for the normal control of tracking servo is about 0.1 mm. Moreover, in a similar way, in the border close process of the optical pickup of the newest DVD-ROM reproduce-only drive, the length in the radial direction of the buffer area necessary for the normal control of tracking servo is about 0.1 mm. Furthermore, according to a study by the present inventors, it is found out that the error between the desired address and the actually accessed position is about 0.15 mm on the information recording/reproducing apparatus, such as a general DVD-ROM drive.

From the above, it is desirable that the length in the radial direction of the short middle area is about 0.25 mm (=0.1+0.15).

Specifically, according to the study by the present inventors, it is found out that the following four types are main factors of the error between the desired address and the actually accessed position. The first factor is the accuracy of the operation of the optical pickup of the information recording/reproducing apparatus, such as a DVD-ROM drive. The second factor is the accuracy of clamping. The third factor is the warping and the face runout or face waving of the surface of the optical disc. The fourth factor is a shift or difference in bonding the two-layer type optical disc. More specifically, as shown in FIG. 10, an explanation will be given for the first factor, which is the accuracy in displacement control of the operation of the optical pickup of the information recording/reproducing apparatus, such as a DVD-ROM drive. Here, it is assumed that in the case where the data in the last position of the data area of the L0 layer, i.e. the data on the outer circumferential side, is read by a DVD-ROM reproduce-only drive, the last address of the data area of he L0 layer is "W0".

For the displacement of the optical disc, a stepping motor or the like is used, for example. Moreover, with regard to a method of displacement control of the optical disc, there are two types of methods: generally, "coarse feed" in which it is quickly displaced through a certain degree of large distance, and "accurate feed" in which it is displaced finely and highly accurately. At first, in order to read the data in the last position of the data area, the drive makes the optical pickup greatly jump to the vicinity of the address "W0" by the coarse feed, for example, and then makes it accurately jump to the vicinity of the address "W0" by the accurate feed.

However, if jumping to the vicinity of the address "W0" by the coarse feed, the optical pickup possibly overreaches the "W0", depending on the drive. As described above, depending on the accuracy in displacement control of the stepping motor when the drive displaces the optical pickup, the error occurs between the desired address and the position actually accessed by the optical disc, on each drive.

Next, with reference to the above-mentioned FIG. 10, as occasion demands, in addition to FIG. 11(a), an explanation will be given for the second factor, which is the accuracy of clamping of the optical disc. When the optical disc is rotated, generally, it is rotated with eccentricity, i.e., shifting slightly from the center of the optical disc, due to the accuracy of clamping. Therefore, even if it is desired to make the optical disc jump to the address "W0" in the last position of the data area of the L0 layer, it is difficult to accurately displace the optical pickup to the desired address.

As described above, the displace control by the stepping motor is performed by using the distance in the radial direction, so that there is a possibility that the optical pickup jumps to a position shifted by the length of the error caused by the eccentricity. This causes the error between the desired address and the position actually accessed by the optical pickup, on each drive.

Next, as shown in FIG. 11(b), as the third factor, the optical disc generally has the warping of the recording surface and the face runout during rotation. Even in this case, in a similar way, there is a possibility that the optical pickup jumps to a position shifted by the error caused by the warping and the face runout. This causes the error between the desired address and the position actually accessed by the optical pickup, on each disc.

Next, as shown in FIG. 11(c), as the fourth factor, there is the shift or difference in bonding the two-layer type optical disc. Namely, in the case of the two-layer type optical disc in a bonding structure, sometimes, the first layer and the second layer are bonded, slightly shifted to each other, depending on the accuracy of a bonding apparatus upon manufacturing. This causes the error between the desired address and the position actually accessed by the optical pickup, on each disc.

Considering the various errors explained above, the buffer area, such as the middle area, is provided on the outer circumferential side, in order to prevent the optical pickup from jumping into a non-signal or unrecorded area. Alternatively, the lead-out area is provided, in the case of a single-layer type optical disc.

Particularly, in the example, the buffer data with an information amount smaller than that of the normal buffer data is recorded into the L0 layer and the L1 layer as the short middle area with a length of about 0.25 mm in the radial direction, in the border dose process when or immediately after a plurality of record information to be recorded is written over both the L0 layer and the L1 layer. By this, it is possible to greatly reduce a time length required for the border close process.

Next, as explained in the above-mentioned FIG. 10, an explanation will be given for the reason to record the lead-out area in the entire unrecorded area of the L1 layer at the time of finalize process.

This is because if the inner circumferential side of the L1 layer is unrecorded, with the dummy data not recorded, for example, the optical pickup may run out of control. Specifically, at first, in the case where the optical pickup of a DVD-ROM drive performs focusing on the L1 layer, i.e., layer focus jump (layer change), in order to access a desired sector number ("Y1" in FIG. 10) in the L1 layer from a predetermined sector number ("X0" in FIG. 10) in the L0 layer, if a sector number ("Z1" in FIG. 10) of the L1 layer which is a destination of the layer focus jump is unrecorded, the optical pickup cannot perform the control of tracking servo by differential phase detection, for example, to thereby run out of control. More specifically, the optical pickup of the DVD-ROM reproduce-only drive which adopts the differential phase detection can hardly or cannot perform at all the control of tracking servo, with respect to the unrecorded area of a DVD-R which adopts a push-pull method in which a guidance groove, such as a groove, is used. It is also appended that this is one example of the case where the information on the DVD-R cannot be reproduced on the DVD-ROM drive. On the other hand, a DVD-R/RW recording apparatus can perform the control of tracking servo with respect to the unrecorded area because it adopts the push-pull method.

Moreover, in a general DVD-ROM drive, according to the standard, two types of access routes are defined in order to make the optical pickup access a desired sector number. As shown in FIG. 10, the first type is an access route along a first path in which the layer focus jump is performed from the sector number "X0" of the L0 layer to the sector number "Z1" of the L1 layer, and then the L1 layer is scanned from the inner to the outer circumferential side, to thereby access the sector number "Y1" of the L1 layer. The second type is an access route along a second path in which the L0 layer is scanned from the sector number "X0" to the sector number "W0" from the inner to the outer circumferential side, and then the layer focus jump is performed, to thereby access the sector number "Y1" of the L1 layer.

(Flow of Recording Operation by One and Another Specific Examples of Second Embodiment of Information Recording Apparatus)

Next, with reference to FIG. 12 to FIG. 14, an explanation will given for (i) a flow of the recording operation if the border close process in the L0 layer and the L1 layer, the recording of the short middle area, and the finalize process are performed, by one and another specific examples of the information recording/reproducing apparatus in the second embodiment of the information recording apparatus of the present invention, and (ii) transition in the recording areas of the L0 layer and the L1 layer. FIG. 12 is a flowchart showing a flow of the recording operation of the optical disc in the case where the short middle area is recorded on the information recording/reproducing apparatus in the second example of the information recording apparatus of the present invention. FIG. 13 is a schematic conceptual view showing transition in the recording areas of the L0 layer and the L1 layer if the border close process in the L0 layer and the L1 layer, the recording of the short middle area, and the finalize process, which correspond to steps S101 to S118 in FIG. 12, are performed by one specific example of the information recording/reproducing apparatus in the second example of the information recording apparatus of the present invention. FIG. 14 is a schematic conceptual view showing transition in the recording areas of the L0 layer and the L1 layer if the border close process in the L1 layer, the recording of the short middle area, and the finalize process, which correspond to steps S101 to S118 in FIG. 12, are performed by another specific example of the information recording/reproducing apparatus in the second example of the information recording apparatus of the present invention. Incidentally, in FIG. 13 and FIG. 14, the right side indicates the outer circumferential side and the left side indicates the inner circumferential side.

The basic structure and the operation in the second example of the information recording apparatus of the present invention, and the data structure or the like of the information recording medium which is a recording target of the information recording apparatus are substantially the same as those in the first example, explained with reference to FIG. 1 to FIG. 11. Moreover, in FIG. 12, the same steps as those in FIG. 7, which indicates the flow of the recording operation in the first example, carry the same step numbers, and the explanation thereof is omitted, as occasion demands.

Particularly, in one and another specific examples of the second example, the above-mentioned judgment branch or judgment process in the step S105 is omitted, which is the judgment of whether or not it is the first border close process for the optical disc; in other words, the judgment of whether or not it is the first border close process in the L0 layer and the L1 layer. In addition, instead of the step S113 in the first example, the management information or the like is recorded into the border-in 105b-0 just behind or just after the border-out 105c-0 previously recorded with a length of about 0.1 mm in the radial direction, or into the lead-in area 101-0 (step S113a).

By this, the border-out 105c-0 with a length of about 0.1 mm in the radial direction is always recorded in the border close process, whether or not it is the first border close process for the optical disc (the step S112). Therefore, it is possible to reduce a recording time length required for the border close process. Incidentally, FIG. 13 and FIG. 14 show that the border-out 105c-0 with a length of about 0.1 mm in the radial direction is always recorded, regardless of in which layer of the L0 layer and the L1 layer the first border close process is performed.

In particular, the buffer data with an information amount smaller than that of the normal buffer data can be recorded into the L0 layer and the L1 layer as the short middle area with a length of about 0.25 mm in the radial direction, because of the normal control of tracking servo by the optical pickup of the newest DVD-ROM reproduce-only drive, in the border close process when or immediately after a plurality of record information to be recorded is written over both the L0 layer and the L1 layer. By this, it is possible to greatly reduce a time length required for the border close process.

In the examples, as one specific example of the information recording apparatus, an information recording/reproducing apparatus for a write-once type optical disc, such as a two-layer type DVD-R, is explained, for example. The present invention, however, can be applied to an information recording/reproducing apparatus for a rewritable type optical disc, such as a two-layer type DVD-R/W, for example. In addition, it can be also applied to an information recording/reproducing apparatus for a multiple layer type optical disc, such as a three-layer type, for example. Moreover, it can be also applied to an information recording/reproducing apparatus for a large-volume recording medium, such as a disc on which blue laser is used for the recording and the reproduction, for example.

The present invention is not limited to the above-described examples, and various changes may be made, if desired, without departing from the essence or spirit of the invention which can be read from the claims and the entire specification. An information recording apparatus, an information recording method, and a computer program which involve such changes, are also intended to be within the technical scope of the present invention.

INDUSTRIAL APPLICABILITY

The information recording apparatus and method, and the computer program according to the present invention can be applied to an information recording apparatus, such as a DVD recorder, which can record various information with high density, for consumer or industrial use, for example. Moreover, they can be applied to a recording apparatus or the like, which is mounted on or can be connected to various computer equipment for consumer or industrial use, for example.

The invention claimed is:

1. An information recording apparatus comprising:

a writing device capable of writing record information onto an information recording medium comprising a first recording layer, on which a lead-in area, a data area and a middle area are disposed in this order from an inner circumferential side to an outer circumferential side, and a second recording layer, on which a middle area, a data area and a lead-out area are disposed in this order from the outer circumferential side to the inner circumferential side;

a first controlling device for controlling said writing device (i) to write the record information into the first recording layer from the inner circumferential side to the outer circumferential side, up to an outer edge of the data area of the first recording layer which is adjacent to and is immediately before an inner edge of the middle area of the first recording layer and (ii) to write the record information into the second recording layer from the outer circumferential side to the inner circumferential side, after the recording of the first recording layer is finished, while a recording direction is turned-around at the outer edge of the data area of the first recording layer which is adjacent to and is immediately before the inner edge of the middle area of the first recording layer, from an outer edge of the data area of the second recording layer which is adjacent to and is immediately after an inner edge of the middle area of the second recording layer;

a second controlling device for controlling said writing device to write a predetermined amount of buffer data on both of (i) one portion of the middle area of the first recording layer which is on an outer circumferential side of the record information written in an area portion of the first recording layer at which the recording direction is turned-around and (ii) one portion of the middle area of the second recording layer which is on an outer circumferential side of the record information written in an area portion of the second recording layer at which the recording direction is turned-around; and a third controlling device for controlling said writing device to add buffer data on an other portion of the middle area of each of the first and second recording layers, wherein, said second controlling device responds to a first border close instruction after the record information is recorded over the first and second recording layers, and said third controlling device responds to a finalize instruction.

2. An information recording method in an information recording apparatus comprising: a writing device capable of writing record information onto an information recording medium comprising a first recording layer, on which a lead-in area, a data area and a middle area are disposed in this order from an inner circumferential side to an outer circumferential side, and a second recording layer, on which a middle area, a data area and a lead-out area are disposed in this order from the outer circumferential side to the inner circumferential side, said information recording method comprising:

a first controlling process of controlling said writing device (i) to write the record information into the first recording layer from the inner circumferential side to the outer circumferential side, up to an outer edge of the data area of the first recording layer which is adjacent to and is immediately before an inner edge of the middle area of the first recording layer and (ii) to write the record information into the second recording layer from the outer circumferential side to the inner circumferential side, after the recording of the first recording layer is finished, while a recording direction is turned-around at the outer edge of the data area of the first recording layer which is adjacent to and is immediately before the inner edge of the middle area of the first recording layer, from an outer edge of the data area of the second recording layer which is adjacent to and is immediately after an inner edge of the middle area of the second recording layer;

a second controlling process of controlling said writing device to write a predetermined amount of buffer data on both of (i) one portion of the middle area of the first recording layer which is on an outer circumferential side of the record information written in an area portion of the first recording layer at which the recording direction is turned-around and (ii) one portion of the middle area of the first recording layer which is on an outer circumferential side of the record information written in an area portion of the second recording layer; and a third controlling process of controlling said writing device to add buffer data on an other portion of the middle area of each of the first and second recording layers, wherein said second controlling process responds to a first border close instruction after the record information is recorded over the first and second recording layers, and said third controlling process responds to a finalize instruction.

3. The information recording apparatus according to claim 1, wherein said writing device includes single pick-up device.

* * * * *